United States Patent
Cui et al.

(10) Patent No.: US 10,545,497 B1
(45) Date of Patent: Jan. 28, 2020

(54) CONTROL METHOD AND DEVICE FOR MOBILE ROBOT, MOBILE ROBOT

(71) Applicant: ANKOBOT (SHANGHAI) SMART TECHNOLOGIES CO., LTD., Shanghai (CN)

(72) Inventors: Yuwei Cui, Shanghai (CN); Zijing Wang, Shanghai (CN)

(73) Assignee: ANKOBOT (SHANGHAI) SMART TECHNOLOGIES CO., LTD., Shanghai (CN)

( * ) Notice: Subject to any disclaimer, the term of this patent is extended or adjusted under 35 U.S.C. 154(b) by 0 days.

(21) Appl. No.: 16/363,830

(22) Filed: Mar. 25, 2019

Related U.S. Application Data

(63) Continuation of application No. PCT/CN2019/070418, filed on Jan. 4, 2019.

(51) Int. Cl.
*G05D 1/00* (2006.01)
*G05D 1/02* (2006.01)
*G06F 3/01* (2006.01)

(52) U.S. Cl.
CPC ......... *G05D 1/0016* (2013.01); *G05D 1/0212* (2013.01); *G05D 1/0246* (2013.01); *G06F 3/011* (2013.01); *G05D 2201/0215* (2013.01)

(58) Field of Classification Search
USPC ......................................................... 701/25
See application file for complete search history.

(56) References Cited

U.S. PATENT DOCUMENTS

2019/0145775 A1    5/2019  Cui et al.

FOREIGN PATENT DOCUMENTS

| CN | 107498555 A | * | 8/2017 |
| CN | 107498555 | | 12/2017 |
| CN | 108888204 A | * | 6/2018 |
| CN | 108888204 | | 11/2018 |
| KR | 1020150014237 | | 2/2015 |

OTHER PUBLICATIONS

International Search Report and Written Opinion for International Application PCT/CN2019/070418, dated Mar. 28, 2019, 11 pages.

* cited by examiner

*Primary Examiner* — Maceeh Anwari
(74) *Attorney, Agent, or Firm* — Leber IP Law; David C. Robertson

(57) ABSTRACT

The present application provides a control method and device for a mobile robot, a mobile robot. The present application through the technical solution that identifying images captured by a visual sensing device and when determining there is a human body in a spatial range taken by the visual sensing device, determining a pose instruction provided by the human body according to at least one image of the human body, and controlling the robot to perform a corresponding operation based on the pose instruction, the pose instruction of the human can be accurately identified, and accuracy and flexibility in executing instruction by the robot can be improved. Meanwhile, the robot can be controlled in real time according to the pose instruction, such that interactivity between the robot and a user can be improved, humanized operation of the robot can be improved, and user experience can be enhanced.

17 Claims, 3 Drawing Sheets

CONTROL METHOD AND DEVICE FOR MOBILE ROBOT, MOBILE ROBOT

RELATED APPLICATION

This application is a continuation application of International Patent Application No. PCT/CN2019/070418, filed Jan. 4, 2019, the entire contents of which are hereby incorporated by reference.

TECHNICAL FIELD

The present application relates to the field of data processing, in particular to a control method and device for a mobile robot, a mobile robot.

BACKGROUND

A mobile robot is a machine which can work automatically. The mobile robot can be operated under the command of human operators or in pre-programmed programs, and can act according to principles set out by the artificial intelligence technology as well. This type of mobile robot can be used indoors or outdoors, and can be used in industry or household. For example, the mobile robot can be used to replace security guards to perform patrol, or replace people to clean the ground. The mobile robot can also be used to accompany family members or assist in doing office work.

Specifically, a cleaning robot can automatically clean floor in a room under the control of human (such as an operator controls the robot by a remote control) or according to some rules, and the cleaning robot can clean clutter on the ground such as hair, dust, debris and so on. Most of the existing mobile robots can only receive some control instructions which are relatively mechanized, and have a low interactivity with users, thereby it is difficult to provide better user experiences to users.

SUMMARY

In view of the above shortcomings in the prior art, an objective of the present application is to provide a control method and device for a mobile robot, a mobile robot, so as to solve problems in the prior art that most of the mobile robots can only receive some control instructions which are relatively mechanized, and have a low interactivity with users, and having difficulty in providing better user experiences to users.

In one aspect, the present application provides a method for controlling a mobile robot, wherein the mobile robot comprises a visual sensing device, and the method comprises: monitoring images from the visual sensing device; identifying the images to determine whether there is a human body in a spatial range taken by the visual sensing device; determining a pose instruction provided by the human body based on a detection of at least one image from the visual sensing device upon determining that there is a human body in the spatial range; and controlling the mobile robot to perform a corresponding operation based on the pose instruction.

In another aspect, the present application provides a mobile robot, the mobile robot comprises: a visual sensing device, configured to acquire images; an executive device, configured to perform a corresponding operation based on a received control instruction; a control device, connected with the visual sensing device, and configured to perform the following control method, the control method comprises the following steps: monitoring images from the visual sensing device; identifying the images to determine whether there is a human body in a spatial range taken by the visual sensing device; determining a pose instruction provided by the human body based on a detection of at least one image from the visual sensing device upon determining that there is a human body in the spatial range; and outputting a control instruction corresponding to the pose instruction to the executive device based on the pose instruction, and controlling the mobile robot to perform a corresponding operation based on the control instruction.

In some embodiments, the step of identifying the images to determine whether there is a human body in a spatial range taken by the visual sensing device comprises: identifying the images to determine whether there is a human body which faces towards the mobile robot in a spatial range taken by the visual sensing device.

In some embodiments, the step of identifying the images to determine whether there is a human body in a spatial range taken by the visual sensing device comprises: identifying the monitored images by using a first algorithm; wherein the first algorithm is obtained through performing machine learning on sample images of human body images containing faces; and determining whether there is a human body which faces towards the mobile robot in the spatial range based on the identified result.

In some embodiments, the step of identifying the images to determine whether there is a human body in a spatial range taken by the visual sensing device comprises: during a movement of the mobile robot, determining a human body which moves relative to a static target and obtaining movement information of the human body based on a comparison result between at least two monitored images; wherein positions of the human body in the at least two images have an attribute of indefinite change.

In some embodiments, the step of determining a pose instruction provided by the human body based on a detection of at least one image from the visual sensing device comprises: acquiring at least one image within a detection time; and detecting the at least one image to determine the pose instruction provided by the human body.

In some embodiments, the step of detecting the at least one image to determine the pose instruction provided by the human body comprises: detecting at least one image which is acquired in a time sequence to determine an candidate pose instruction provided by the human body, and repeating the detecting step to obtain multiple candidate pose instructions for each execution; and determining the pose instruction provided by the human body based on the obtained multiple candidate pose instructions.

In some embodiments, the step of determining a pose instruction provided by the human body based on a detection of at least one image from the visual sensing device comprises: determining the pose instruction provided by the human body by detecting the at least one image through using a second algorithm which is set based on machine learning.

In some embodiments, the pose instruction executed by the control device comprise at least one of the following pose instructions: a pose instruction indicating approaching, a pose instruction indicating keeping far away, and a pose instruction indicating noise reduction.

In some embodiments, the control method further comprises a step of verifying a permission of the human body that provides the pose instruction.

In some embodiments, the step of verifying a permission of the human body that provides the pose instruction comprises: when multiple human bodies are determined to have a permission after verified, selecting one of the human bodies which have a permission, identifying a pose instruction of the selected human body, and performing a corresponding operation.

In some embodiments, the step of outputting a control instruction corresponding to the pose instruction to the executive device based on the pose instruction comprises: localizing a position information of the human body relative to the mobile robot when determining the pose instruction; and outputting a control instruction containing a corresponding movement operation to the executive device based on the position information and the pose instruction.

In some embodiments, the executive device comprises a movement device; and the step of outputting a control instruction containing a corresponding movement operation to the executive device based on the position information and the pose instruction comprises: planning a navigation route of the mobile robot based on the position information and the pose instruction; and outputting a control instruction containing the navigation route to the executive device, such that the executive device can perform a movement operation based on the navigation route.

In some embodiments, the mobile robot is a cleaning robot; and the step of planning a navigation route of the mobile robot based on the position information and the pose instruction comprises: planning a navigation route of the mobile robot based on the position information, the pose instruction and uncleaned regions.

In some embodiments, the executive device comprises a cleaning device; and the step of outputting a control instruction corresponding to the pose instruction to the executive device based on the pose instruction, and controlling the mobile robot to perform a corresponding operation based on the control instruction comprises: outputting a control instruction corresponding to the pose instruction to the executive device based on the pose instruction, and adjusting the current state of the cleaning device based on the control instruction.

In some embodiments, the mobile robot further comprises a voice processing device, configured to acquire a voice instruction; when the cleaning device is adjusted to be in a low-noise state based on the pose instruction, the control device is further configured to control the executive device to perform a corresponding operation based on the acquired voice instruction.

In another aspect, the present application provides a control device for a mobile robot, wherein the mobile robot comprises a visual sensing device and an executive device, and the control device comprises: an input unit, configured to receive images captured by the visual sensing device; a storage unit, configured to store at least one program and images captured by the visual sensing device of the mobile robot; a processing unit, configured to invoke the at least one program and perform the following control method; and an output unit, configured to output a control instruction to corresponding executive device, the control instruction is generated by the processing unit and is used for performing the control method; wherein the control method comprises: monitoring images from the visual sensing device; identifying the images to determine whether there is a human body in a spatial range taken by the visual sensing device; determining a pose instruction provided by the human body based on a detection of at least one image from the visual sensing device upon determining that there is a human body in the spatial range; and outputting a control instruction corresponding to the pose instruction to the executive device based on the pose instructions, and controlling the mobile robot to perform a corresponding operation based on the control instruction.

As mentioned above, the control method and device for a mobile robot, the mobile robot and the storage medium of the present application have the following beneficial effects: through the technical solution that identifying images captured by a visual sensing device and when determining there is a human body in a spatial range taken by the visual sensing device, determining a pose instruction provided by the human body according to at least one image of the human body, and controlling the mobile robot to perform a corresponding operation based on the pose instruction, the pose instruction of the human can be accurately identified, and accuracy and flexibility in executing instruction by the mobile robot can be improved. Meanwhile, the mobile robot can be controlled in real time according to the pose instruction, such that interactivity between the mobile robot and a user can be improved, humanized operation of the mobile robot can be improved, and user experience can be enhanced.

DETAILED DESCRIPTION

Figure 1:
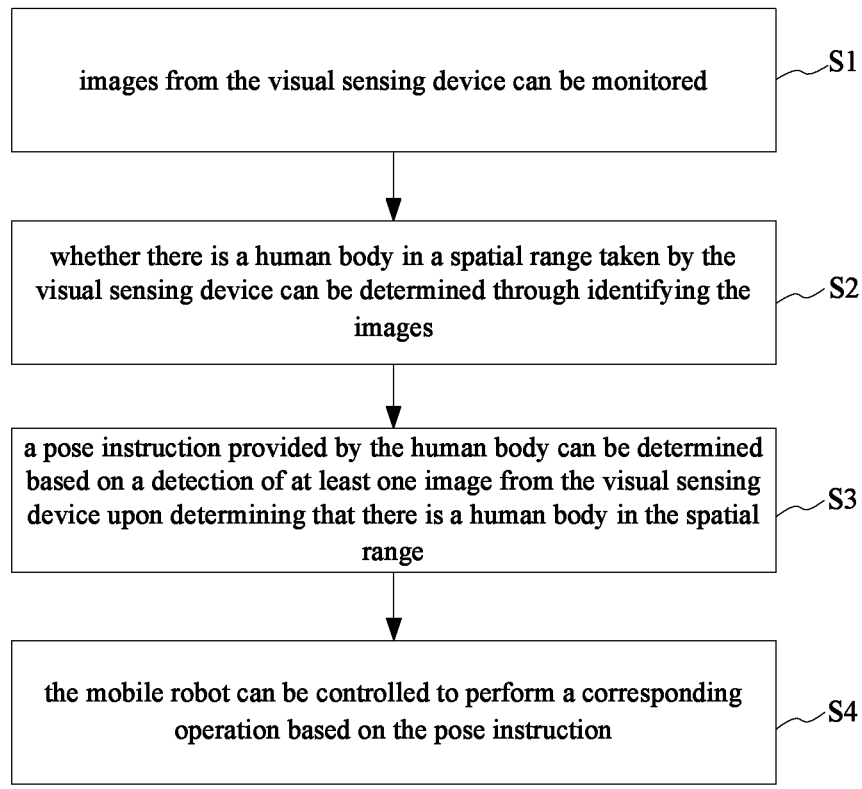
FIG. 1 shows a flow diagram of a control method of a mobile robot of the present application in one embodiment.

Implementations of the present application will be described below through specific embodiments, and those skilled in the art can easily understand other advantages and effects of the present application from the contents disclosed in the present specification.

Moreover, as used herein, such single forms as "one", "a" and "the" aim at also including the plural forms, unless contrarily indicted in the text. It should be further understood that, such terms as "comprise" and "include" indicate the existence of the features, steps, operations, elements, components, items, types and/or groups, but do not exclude the existence, emergence or addition of one or more other features, steps, operations, elements, components, items, types and/or groups. The terms "or" and "and/or" used herein are explained to be inclusive, or indicate any one or any combination. Therefore, "A, B or C" or "A, B and/or C" indicates "any of the following: A; B; C; A and B; A and C; B and C; A, B and C". Exceptions of the definition only exist when the combinations of elements, functions, steps or operations are mutually exclusive inherently in some ways. In addition, the terms "first", "second", etc. are used herein to describe various elements in some examples, these elements should not be limited by these terms. These terms are only used to distinguish one element from another.

The present application will be described in detail below with reference to the accompanying drawings and specific embodiments.

A mobile robot can perform a corresponding operation based on a control instruction. The mobile robot is a machine which can work automatically. The mobile robot can be operated under the command of human operators or in pre-programmed programs, and can act according to principles set out by the artificial intelligence technology as well. This type of mobile robot can be used indoors or outdoors, and can be used in industry, business or household. For example, the mobile robot can be used to replace security guards to perform patrol, or replace people to clean the surface. The mobile robot can also be used to accompany family members or assist in doing office work. With the most common cleaning robot as an example, a cleaning robot is also named an automatic sweeper or an intelligent dust collector, which is one type of intelligent household electrical appliances, and can perform tasks such as sweeping, dust collecting or mopping. Specifically, the cleaning robot can automatically clean floor in a room under the control of human (such as an operator controls the robot by a remote control) or according to some rules, and the cleaning robot can clean clutter on the ground such as hair, dust, debris and so on. Most of the existing mobile robots can only receive some control instructions which are relatively mechanized, and have a low interactivity with users, thereby it is difficult to provide better user experiences to users.

In view of this, the present application discloses a method for controlling a mobile robot, in the control method, images within a field of view of a visual sensing device can be acquired constantly through the visual sensing device of the mobile robot, and whether there is a human in the field of view is determined based on an identification of the acquired images, when there is a human, a pose instruction of the human can be determined, and the mobile robot can be controlled to perform a corresponding operation according to the pose instruction. As to the control method of a mobile robot in the present application, a rate of mis-identification of some pose instructions can be reduced effectively, for example, a pose of a dummy being misidentified to be a pose instruction can be reduced, because a human body can be further identified when a pose instruction is identified; and since the mobile robot can be controlled in real time according to the pose instruction, interactivity between a mobile robot and a user can be improved, and humanized operation and identification accuracy rate of a mobile robot can be improved.

Herein, please refer to FIG. 1 which shows a flow diagram of a control method of a mobile robot of the present application in one embodiment. Wherein, the control method of the mobile robot can be performed by a processing device contained in the mobile robot. Wherein the processing device is an electronic device which is capable of performing numeric calculation, logical calculation or data analysis, and the processing device includes but is not limited to: CPU, GPU or FPGA, and volatile memory configured to temporarily store intermediate data generated during calculation. The mobile robot includes a visual sensing device. The visual sensing device can be an image acquisition device or a TOF sensor which can describe surface shape, color or structure of an object within a spatial range by using two-dimensional or three-dimensional data. The mobile robot includes but is not limited to: a household robot, a cleaning robot, a patrol robot, or a window-cleaning robot.

Wherein, the mobile robot at least includes an image acquisition device. The image acquisition device captures images within a field of view of the image acquisition device at a position in which a mobile robot is located. In some embodiments, the image acquisition device is arranged on the top, shoulder or back of the mobile robot, and a principal optic axis thereof is vertical to a plane over which the mobile moves (hereinafter, moving plane) of the mobile robot, or the principal optic axis thereof is consistent with an travelling direction of the mobile robot. In some other embodiments, the principal optic axis can also be set to form an included angle (for example, an angle between 0° and 90°) with the moving plane of the mobile robot, so as to obtain more features. In other embodiments, the principal optic axis of the image acquisition device can also be set in many other ways, for example, the image acquisition device can rotate according to a certain rule or randomly, at this time, the angle between the optic axis of the image acquisition device and a travelling direction of the mobile robot is changed, therefore, assemble manners of the image acquisition device and states of the principal optic axis of the image acquisition device are not limited to the present embodiments. Herein, the mobile robot includes at least one image acquisition device, the image acquisition device can be assembled on the mobile robot by any manners mentioned above and can acquire images which are used for performing the control method. The image acquisition device includes but is not limited to: camera, video camera, camera modules integrated with an optical system or CCD chips, and camera modules integrated with an optical system and CMOS chips. Or, the image acquisition device includes but is not limited to: fisheye camera modules, wide angle (or non-wide angle) camera modules.

The TOF sensor is based on the TOF technology. The TOF technology is one of optical non-contact three-dimensional depth measurement sensing methods, and has illumination units which constitutes area arrays, and each illumination unit is used to detect depth data of a corresponding measurement point. Wherein, for example, a single illumination unit can obtain distance from a target through continuously transmitting a light pulse to the target, receiving light returned from the object, and detecting the flight (round trip) time of the emission of light pulse and reception of light pulse. Each illumination unit of the TOF emits light after being high-frequency modulation. In general, high-performance pulsed light can be emit by LED or laser (including laser diode and VCSEL (Vertical Cavity Surface Emitting Laser)). In an embodiment of the present application, laser is used to emit high performance pulsed light. The pulse can reach about 100 MHz, in view of this, infrared light is mainly used. The principles of TOF sensor application are: 1) optical shutter-based method; this method can be implemented through the following steps: emitting a pulsed light wave, and obtaining the time difference t of the light wave reflected back after being irradiated to the three-dimensional object quickly by the optical shutter, due to the speed of light c is known, as long as the time difference between the emission of light and the reception of light is known, the distance of roundtrip can be obtained by $d=t/2 \cdot c$. 2) continuous wave intensity modulation-based method; this method can be implemented through the following steps: emitting a beam of illumination light, and performing distance measurement by using a phase change of the emitted light wave signal and the reflected light wave signal. The wavelength of the illumination module in the illumination unit is generally in the infrared band, and high frequency modulation is required. The photosensitive module in the illumination unit is similar to the ordinary mobile phone camera module, and comprises a chip, a lens, a circuit board and the like. Each pixel of the TOF sensor chip records the phase of the emitted light wave between the camera and the object respectively, the data processing unit extracts the phase difference, and the depth information is calculated by the formula. The TOF sensor has a small volume and can directly output the depth data of the detected object, and the depth calculation result of the TOF sensor is not affected by the gray level and characteristics of the object surface, so the TOF sensors can perform the three-dimensional detection very accurately, and images used for monitoring can be obtained based on the depth data and the corresponding measurement lattice position, or after the depth data of each measurement lattice position is smoothed. The TOF sensor can be mounted on the body side of the mobile robot.

Please refer to FIG. 1 which shows a flow diagram of a control method of a mobile robot of the present application in one embodiment. As shown in the figure, the control method of the mobile robot includes steps S1 to S4.

In step S1: images from the visual sensing device can be monitored. Wherein, a power supply system of the visual sensing device can be controlled by a power supply system of the mobile robot, and during the mobile robot is powered on, the visual sensing device is in a state of acquiring images. For example, when the mobile robot is in a charging period, an operating period or a recharging period, images within a field of view of the visual sensing device can be acquired through the visual sensing device, and the processing device can acquire images captured by the visual sensing device through monitoring in a manner of frame by frame or frame skipping. The mobile robot can be for example a cleaning robot, and the cleaning robot captures multiple-frame images during the period of charging, operating or recharging. In other words, in step S1, the processing device acquires multiple-frame images captured by the visual sensing device continuously when the mobile robot is powered on. Wherein the charging period includes a time period of charging and a time period in which charging has been completed but the mobile robot is still connected with a charger. The operating period includes but is not limited to: a time period in which a mobile robot performs corresponding operations based on the received instructions, for example, a time period in which a mobile robot moves and patrols based on patrol instructions, for another example, a time period in which a mobile robot moves and cleans based on cleaning instructions, and for still another example, a time period in which a mobile robot moves and searches for a control object based on a instruction of transmitting control signal. The recharging period includes a time period in which a power supply system of a mobile robot returns to a charger autonomously after monitoring that the energy stored in batteries is lower than a preset quantity of electric charge (or voltage value).

It should be noted that, the above periods are not mutually exclusive, for example, a period in which a mobile robot cleans the floor and moves along a recharging route is a recharging period as well as an operating period. Therefore, periods for acquiring images which are divided according to actual application scenarios can all be deemed as specific examples of periods for acquiring images by the processing device.

In step S2: whether there is a human body in a spatial range taken by the visual sensing device can be determined through identifying the images. Wherein the spatial range is defined according to a field of view taken by the visual sensing device and a space in which the visual sensing device is located. For example, the visual sensing device is arranged in the middle of a top of a mobile robot, and has a field of view of approximately 180°. When a mobile robot is located in a room, the visual sensing device can capture all the unobstructed objects which are located in the room, above the top of the mobile robot, and in a spatial range of a field of view of approximately 180°, and obtain corresponding image. The captured image includes such as objects placed in the room, walls and roofs, and when a human enters the spatial range, the captured image also includes the human.

Herein, in order to improve accuracy rate for identifying pose instructions, the human body identified in the step S2 is a human who can provide pose instructions, rather than decorative items which keep a certain pose such as a dummy for showing clothes. For this, in some examples, a processing device in the mobile robot can use preset image features regarding to a human body to match with the captured images, and use preset image features regarding to dummy to screen the captured images, thereby determine that a human body is identified.

In some other examples, in order to reduce response times of subsequent steps and to lower internal friction of a system, step S2 includes: identifying the images to determine there is a human body which face towards the mobile robot in a spatial range taken by the visual sensing device. Similar to the above examples, a processing device in the mobile robot can use preset image features containing faces of a human body to match with the captured image, and use preset image features regarding to dummy to screen the captured image, thereby determine that a human body facing towards the mobile robot is identified.

Figure 2:
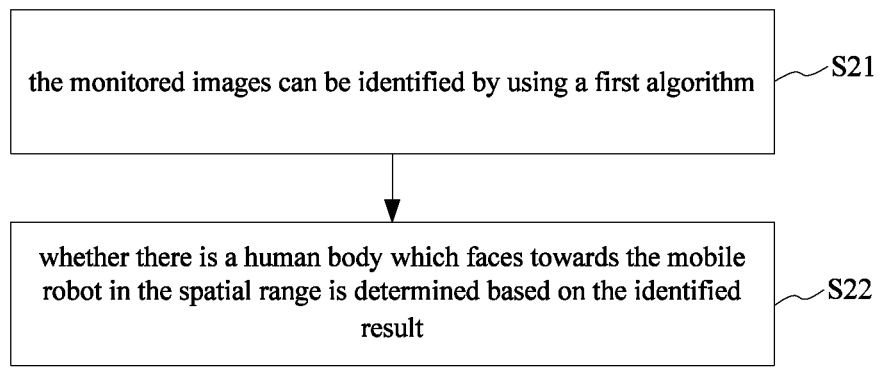
FIG. 2 shows a flow diagram of determining whether there is a human body in a spatial range taken by a visual sensing device in one embodiment of the present application.

In some other examples, please refer to FIG. 2 which shows a flow diagram of determining whether there is a human body in a spatial range taken by a visual sensing device in one embodiment of the present application. Wherein the step of identifying the images to determine whether there is a human body in a spatial range taken by the visual sensing device includes step S21 and step S22.

In step S21, the monitored images can be identified by using a first algorithm; wherein the first algorithm is obtained through performing machine learning on sample images of human body images containing faces.

In step S22, whether there is a human body which faces towards the mobile robot in the spatial range is determined based on the identified result.

In some embodiments, the first algorithm can be a first neural network algorithm. In some embodiments, the first neural network algorithm can be a neural network algorithm based on a convolutional neural network structure. The network structure includes an input layer, at least one hidden layer and at least one output layer. Wherein the input layer is configured to receive captured images or preprocessed images; the hidden layer includes a convolutional layer and an activation function layer, and the hidden layer even can include at least one of a normalization layer, a pooling layer and a fusion layer. The output layer is configured to output images marked with identified result of a human body. The connection mode is determined according to a connection relationship of each layer in the neural network structure, for example, a connection relationship between a front layer and a rear layer set based on data transmission, a connection relationship with data of the front layer set based on size of a convolution kernel in each hidden layer, a full connection, and so on. According to the training set for the first algorithm, sample images containing images of a real human can be taken as positive samples, sample images containing images of a dummy and/or containing no human can be taken as negative samples, and the first algorithm which is trained based on the above training set can be used to identify a human body. When used, the trained first algorithm is used to identify positions of sensitive areas of a human body in images and confidence coefficient of positions of sensitive areas of a human body in images, screen the positions in the images based on a screening condition which contains a preset confidence interval of a human body, and output the identified positions of a human body in the image. Wherein the sensitive areas of a human body include but are not limited to: a facial area, a head area, a shoulder area, an arm area, a trunk area, and a leg area. The sensitive areas of a human body further include feature point or a combination of feature points located in any of the above areas. For example, the feature point include but is not limited to: feature point at face, feature point at shoulder contour, feature point at elbow (or knee), and feature point at trunk contour. Wherein the preset confidence interval of a human body include but is not limited to at least one or combination of the following: a numerical range about a confidence interval of a human body for each sensitive area of a human body, and number of feature points about each sensitive area of a human body. With a screening condition which contain a confidence interval of a human body containing facial area as an example, the screening condition preset in a mobile robot include: confidence coefficient of each feature point in the facial area obtained through the first algorithm all falls within a preset confidence interval of a human body, and the number of feature points in the facial area obtained through the first algorithm satisfies a preset threshold. The mobile robot determines a human body which can provide a pose instruction and determines a position region of the human body in the image through identifying images which are satisfied with the screening condition.

According to the training set for the first algorithm, sample images containing images of real human face can be taken as positive samples, sample images containing images of a dummy or containing no human can be taken as negative samples, and the trained first algorithm can be used to identify a human body facing towards a mobile robot.

With a pose instruction provided by a user when facing towards a mobile robot being a valid instruction as an example, a training set for the first algorithm includes: positive sample images with facial features, and negative sample images with no facial features, wherein, the positive sample images are sample images containing human face. The human face for example includes facial contours, and facial areas such as eyes, nose, or mouth area. When the first algorithm is trained according to the sample images, a certain proportion of sample images can be taken as a training set, while other sample images can be taken as a test set. For example, 80% sample images are taken as a training set, and 20% sample images are taken as a test set. The obtained first algorithm is preset in a storage of a mobile robot, such that the processing device can use the first algorithm during operation.

The first algorithm obtained through training is used to identify positions of sensitive areas of a human face (i.e., facial sensitive areas) in images and confidence coefficient thereof, screen the identified positions of facial sensitive areas in the images and confidence coefficient of positions of facial sensitive areas in the images based on a preset facial confidence interval which is constituted by facial sensitive areas, output a result indicating there is a human body facing towards the mobile robot. Wherein the facial sensitive area include but is not limited to: eye area, nose area, cheek area, mouth area and ear area. The sensitive areas of a human body further include feature point or a combination of feature points located in any of the above areas. For example, the feature point include but is not limited to: feature point at a corner of eye, feature point at a tip of nose, feature point at a corner of mouth, feature point set based on a preset cheek module, and feature point at an ear contour. Wherein the facial confidence interval includes but is not limited to at least one or combination of the following: a numerical range about a confidence interval for each sensitive area of a human body, the number of feature points about each sensitive area of a human body, and confidence intervals set based on geometrical relationship constituted by different sensitive areas of a human body. In some examples, a preset facial screening condition in a mobile robot includes: a confidence interval of a geometrical relationship constituted by feature points in at least two types of facial sensitive areas is preset, and when a geometrical relationship constituted by corresponding feature points obtained through the first algorithm falls within the confidence interval, the mobile robot determines a human body which provides a pose instruction and determines a position region of the human body in an image. Wherein the feature points in the types of at least two facial sensitive areas include but are not limited to: feature points in an eye area and a nose area, feature points in a nose area and a mouth area, and feature points in an eye area, a nose area and a cheek area. The geometrical relationship includes but is not limited to: a proportion of lines and a proportion of angles in each geometric figure constituted by multiple feature points. The geometric figure includes but is not limited to a triangle.

In some other examples, the sample images are images combined from multiple images, or videos formed based on multiple images, wherein the multiple images are images which are intercepted from videos and indicate body pose changes and/or facial expression changes of a human body. Wherein pose change of body includes but is not limited to at least one or combination of the following changes: pose change of four limbs, pose change of a head, and pose change of a trunk. Wherein pose change of four limbs for example includes leg stretched (or leg brought back), arm bended (or arm extended), or finger bended (or finger extended), and so on. Pose change of a head for example includes head titled, head raised, or head lowered. Pose change of a trunk for example includes forward bends, backward bends, or side bends. Change of facial expressions includes but is not limited to at least one or combination of the following: change of eye expression, change of mouth expression, and change of cheek expression. Wherein change of eye expression for example includes blinking, staring or squinting. Change of mouth expression for example includes mouth open, mouth close, laughing or crying. Change of cheek expression for example includes cheek expressions when matching with change of expression of mouth, nose or eye. When the first algorithm is trained according to the sample images, a certain proportion of sample images can be taken as a training set, while other sample images can be taken as a test set. For example, 80% sample images are taken as a training set, and 20% sample images are taken as a test set. The obtained first algorithm is preset in a storage of a mobile robot, such that the processing device can use the first algorithm during operation.

When the processing device executes the first algorithm and identifies that there is a human body which face towards the mobile robot in the spatial range in the image, the image output by the first algorithm have a rectangular frame added in a designated region in which a human body located, so as to indicate that there is a human body which faces towards the mobile robot in the rectangular frame. After identifying the human body in the image, a step of identifying a pose instruction can be performed to identify a pose of the human body in the rectangular frame, thereby accuracy rate for identifying pose instructions can be improved. Wherein the step of identifying a pose instruction will be described in detail later.

Herein, the first algorithm can be updated according to the currently updated sample images. Wherein due to the heavy computational efforts in training and updating the first algorithm, the requirement of hardware in device which carries and executes the algorithm is high. In some embodiments, the training and updating for the first algorithm can be performed on a cloud server, so as to reduce operating pressure of the local mobile robot, lower requirements of hardware in the mobile robot, and improve executive efficiency of the mobile robot. Further, a strong processing function of the cloud server can be utilized sufficiently, such that the above method can be performed more rapidly and accurately.

In some other embodiments, during a movement of a mobile robot, for example, during a cleaning period or during a recharging movement period, a human body provided a pose instruction needs to be identified accurately, so as to reduce misjudgment of dummy, in view of this, at least two images can be used to identify the human body. To this end, the step of identifying images to determine whether there is a human body in a spatial range taken by the visual sensing device includes step S21'.

In step S21', during a movement of the mobile robot, a human body which moves relative to a static target can be determined and movement information of the human body can be obtained based on a comparison result between at least two monitored images. Wherein positions of the human body in the at least two images have an attribute of indefinite change. During identification of a human body, such situations in which a puppet in a human form or image of a human body which is displayed on picture or display screen is misjudged to be a valid human body provided pose instructions can be reduced effectively through step S21'.

wherein, the mobile robot can include a movement device. The movement device can include a travelling mechanism and a travelling drive mechanism. The travelling mechanism can be arranged at a bottom of the robot, and the travelling drive mechanism is internally arranged inside the robot. The travelling mechanism can for example include a combination of two straight-going walking wheels and at least one auxiliary steering wheel, wherein the two straight-going walking wheels are respectively arranged at two opposite sides at a bottom of a robot, and the two straight-going walking wheels can be independently driven by two corresponding travelling drive mechanisms respectively, that is, a left straight-going walking wheel is driven by a left travelling drive mechanism, while a right straight-going walking wheel is driven by a right travelling drive mechanism. The universal walking wheel or the straight-going walking wheel can be provided with a biased drop suspension system which is fixed in a movable manner, for example, the biased drop suspension system can be installed on a robot in a rotatable manner and receives spring bias which is downwards or offset away from the robot. The spring bias allows the universal walking wheel or the straight-going walking wheel to maintain contact and traction with the ground at a certain landing force. In practical applications, in a case that at least one auxiliary steering wheel does not participate in travelling, the two straight-going walking wheels are mainly used for going forward and backward, while in a case that the at least one auxiliary steering wheel participates and matches with the two straight-going walking wheels in travelling, movements such as steering and rotating can be realized. The travelling drive mechanism can include a drive motor and a control circuit configured to control the drive motor, and the drive motor can be used to drive the walking wheels in the travelling mechanism to move. In specific implementations, the drive motor can be for example a reversible drive motor, and a gear shift mechanism can be arranged between the drive motor and the axle of a walking wheel. The travelling drive mechanism can be installed on the robot in a detachable manner, thereby facilitating disassembly and maintenance. In the present embodiment, the mobile robot captures images through the visual sensing device when moving, that is, the processing device acquires images captured by the visual sensing device under an operating state of the mobile robot. In some embodiments, the images are for example images captured within a continuous time period, or images acquired within two or more discontinuous time periods respectively. The at least two images are images captured by a visual sensing device in partially overlapped field of view, the visual sensing device is for example an image acquisition device, the image acquisition device captures video images within its field of view in an powered-on period, and the two images can be two frames in video images captured by the image acquisition device.

In some embodiments, the relative static target for example includes but is not limited to: ball, shoe, wall, flowerpot, cloth or hat, roof, lamp, tree, table, chair, refrigerator, television, sofa, sock, tiled object, or cup. Wherein, tiled object includes but is not limited to ground mat or floor tile map paved on the floor, and tapestry or picture hanged on the wall.

Wherein, two images selected by a processing device should be images captured by the image acquisition device in a partially overlapped field of view, that is, the processing device determines to select a first frame image and a second frame image on the basis that there is an image overlapping region in the two images, and there is a static target in the overlapped field of view, so as to monitor a human body which moves relative to the static target in the overlapped field of view. In order to ensure effectiveness of compared results between two selected images, the proportion of the image overlapping region in the first frame image and the proportion of the image overlapping region in the second frame image can also be set, for example, the proportion of the image overlapping region in the first frame image and the proportion of the image overlapping region in the second frame image are respectively at least 50% (but the proportions are not limited to this, and different proportions of the first frame image and the second frame image can be set according to actual conditions). The selection of the first frame image and the second frame image should have the continuity, and while ensuring that the first frame image and the second frame image have a certain proportion of an image overlapping region, the continuity of a moving track of a human body can be judged according to acquired images. Several manners of selecting the image will be enumerated below, the image selection methods described in the examples are merely some specific manners, and the manners of selecting the first frame image and the second frame image are not limited to these, other image selection manners which can ensure that two selected images are relatively continuous images and have an image overlapping region with a preset proportion can all be applied to the present application.

In some implementations, the mobile robot includes the visual sensing device, the processing device respectively selects the first frame image and the second frame image at a first position and a second position which have an overlapped field of view according to a field of view of the visual sensing device.

For example, the visual sensing device can capture videos, since videos are composed of image frames, during the movement of the mobile robot, the processing device can continuously or discontinuously collect image frames in the acquired videos to acquire multiple-frame images, and selects the first frame image and the second frame image according to a preset number of frame intervals, wherein the two images have a partially overlapping region, and then the processing device performs image comparison on two selected images.

For another example, during a movement of the mobile robot, the processing device can preset the time interval at which an visual sensing device captures images, and acquire multiple-frame images captured by the visual sensing device at different time. In multiple-frame images, two images are selected for comparison, and the time interval should be at least smaller than the time taken by the mobile robot in moving in one field of view, such that two images selected in the multiple-frame images have a partially overlapping part can be ensured.

For another example, the visual sensing device can capture images within its field of view at a preset time period, and then the processing device acquires images captured by the visual sensing device at a preset time period at different time, and selects two of the images to serve as the first frame image and the second frame image, wherein, the two images have a partially overlapping part. Wherein the time period can be represented by a time unit, or the time period can be represented by number of image frames interval.

For another example, the mobile robot is in communication with an intelligent terminal, and the intelligent terminal can modify the time period through a specific APP (applications). For example, after the APP is opened, a modification interface of the time period is displayed on a touch screen of the intelligent terminal, and the time period can be modified through a touch operation on the modification interface; or the time period can be modified through sending a time period modification instruction directly to the mobile robot. The time period modification instruction can be for example a voice containing modification instruction, the voice can be for example "the time period is modified to be three seconds". For another example, the voice can be "the number of image frame interval can be modified to be five". Wherein, positions of the human body in the at least two images have an attribute of indefinite change. For example, the movement of the human body can be a whole body movement or partial body movement during a movement of the mobile robot. Wherein, the partial movement is for example a movement of part of a human body such as a head, arm or leg of the human body. When the human body performs whole body movement or partial body movement during a movement of the mobile robot, the movement of the human body has an attribute of indefinite change. In some embodiments, the mobile robot moves in a map which is constructed in advance through the movement device, and the visual sensing device captures multiple-frame images during the movement of the mobile robot. The processing device selects two images from the multiple-frame images for comparison, and the selected two images are the first frame image and the image respectively based on the order in which the images are selected. A corresponding position at which the mobile robot acquires the first frame image is the first position, while a corresponding position at which the mobile robot acquires the second frame image is a second position. The two images have an image overlapping region, and there is a static target in an overlapped field of view of the visual sensing device. Since the mobile robot is in a moving state, a position of the static target in the second frame image has changed definitely relative to a position of the static target in the first frame image, the definite change amplitude of positions of the static target in the two images has correlation with movement information of the mobile robot in the first position and the second position, and the movement information can be for example information containing moving distance and pose change of the mobile robot from the first position to the second position. In some embodiments, the mobile robot includes a position measurement device, the position measurement device of the mobile robot can be used to obtain movement information of the mobile robot, and relative position information between the first position and the second position can be measured according to the movement information.

The position measurement device includes but is not limited to a displacement sensor, a ranging sensor, a cliff sensor, an angle sensor, a gyroscope, a binocular visual sensing device and a speed sensor, which is arranged on the mobile robot. During the movement of the mobile robot, the position measurement device continuously detects movement information and provides the movement information to the processing device. The displacement sensor, the gyroscope and the speed sensor etc., can be integrated into one or more chips. The ranging sensor and the cliff sensor can be arranged at the side of a mobile robot. For example, the ranging sensor in a cleaning robot can be arranged at the edge of a housing; and the cliff sensor in the cleaning robot can be arranged at the bottom of the robot. According to the type and number of sensors arranged in a mobile robot, the movement information acquired by the processing device includes but is not limited to, displacement information, angle information, information about distance between the robot and an obstacle, velocity information and travelling direction information. For example, the position measurement device can be a counting sensor arranged on a motor of the mobile robot, and the rotation number at which the motor operates is used to obtain a relative displacement of the mobile robot from the first position to the second position, and an angle at which the motor operates is used to obtain pose information, etc.

In some other embodiments, with the map being a grid map as an example, a mapping relationship between a unit grid length and an actual displacement can be determined in advance, and a relative position information between the first position and the second position can be obtained through determining the number of grids when the mobile robot moves from the first position to the second position based on the movement information obtained during movement of the mobile robot.

With the map which is constructed in advance being a vector map as an example, a mapping relationship between a unit vector length and an actual displacement can be determined in advance, and a relative position information between the first position and the second position can be obtained through determining a vector length when the mobile robot moves from the first position to the second position based on the movement information obtained during the movement of the mobile robot. The vector length can be calculated in pixels. Moreover, relative to the position of the static target in the first frame image, the position of the static target in the second frame image is shifted by a vector length which corresponds to the relative position information, therefore, the movement of the static target captured in the second frame image relative to the static target captured in the first frame image can be determined according to the relative position information of the mobile robot, thereby having an attribute of definite change. But in the overlapped field of view, movement of the human body in the selected two images does not conform to the above attribute of definite change.

Figure 3:
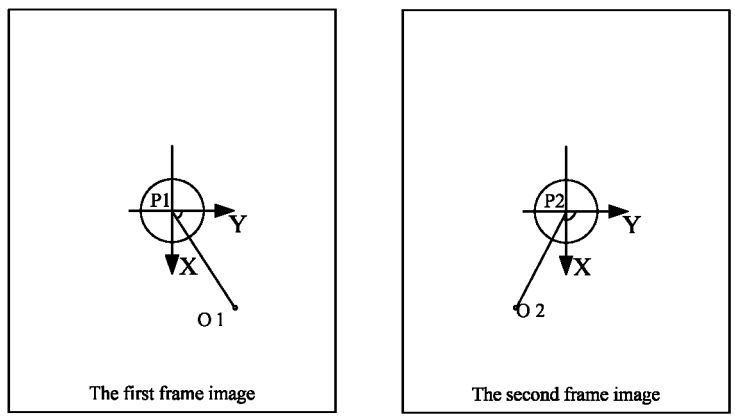
FIG. 3 shows image schematic diagrams of two images selected in one embodiment of the present application.

Please refer to FIG. 3 which shows image diagrams of two images selected in one embodiment of the present application. In the present embodiment, the principal optic axis of the visual sensing device is set to be vertical to a moving plane, then a plane in which a two-dimensional image captured by the visual sensing device is located is in parallel with the moving plane of the mobile robot. In this manner, the position of an entity object in the image captured by the visual sensing device can be used to indicate a position at which the entity object is projected onto the moving plane of the mobile robot, and an angle of the position of the entity object in the image relative to a travelling direction of the mobile robot is used to indicate an angle of the position at which the entity object is projected onto the moving plane of the mobile robot relative to the travelling direction of the mobile robot. Two images selected in FIG. 3 are the first frame image and the second frame image respectively, the corresponding position at which the mobile robot acquires the first frame image is the first position P1, and the corresponding position at which the mobile robot acquires the second frame image is the second position P2. In the present embodiment, when the mobile robot moves from the first position P1 to the second position P2, the mobile robot only changes in distance but not in pose, and relative position information of the mobile robot at the first position P1 and the second position P2 can be acquired only by measuring relative displacement between the first position P1 and the second position P2. The two images have an image overlapping region, and there is a static target O as shown in FIG. 3 in the overlapped field of view of the visual sensing device. Since the mobile robot is in a moving state, the position of the static target O in the second frame image is changed definitely relative to the position of the static target O in the first frame image, and the definite change amplitude of the position of the static target O in the two images has correlation with movement information of the mobile robot in the first position P1 and the second position P2, and in the present embodiment, the movement information can be for example a movement distance when the mobile robot moves from the first position P1 to the second position P2. In the present embodiment, the mobile robot includes a position measurement device, and the movement information of the mobile robot can be acquired by the position measurement device of the mobile robot. For another example, the position measurement device can measure a moving speed of the mobile robot, and calculates a relative displacement from the first position to the second position based on the moving speed and moving time. In some other embodiments, the position measurement device can be a GPS system (Global Positioning System), and relative position information between the first position P1 and the second position P2 can be obtained based on localization information of the GPS in the first position and the second position. As shown in FIG. 3, a position of the static target O in the first frame image is a static target projection O1, and a position of the static target O in the second frame image is a static target projection O2, and it can be seen from FIG. 3 that, the position of the static target projection O1 in the first frame image is changed to the position of the static target projection O2 in the second frame image, and the changes in distance of the static target projection O2 relative to the static target projection O1 in the images is in a certain proportion to a relative displacement between the first position P1 and the second position P2, and the changes in distance of the static target projection O2 relative to the static target projection O1 in images can be definitely acquired based on a ratio of actual distance per unit to pixel in the image, therefore, the movement of the static target captured in the second frame image relative to the static target captured in the first frame image can be determined according to the relative position information of the mobile robot, thereby having an attribute of definite change. However, in the overlapped field of view, movement of the human body in the selected two images does not conform to the above attribute of definite change.

In some other embodiments, the position measurement device can be a device which can perform location process through measuring wireless signals, for example, the position measurement device can be a bluetooth (or WiFi) localization device. The position measurement device can determine relative position of each of the first position and the second position relative to a preset wireless locating signal transmitting device through measuring power of wireless locating signal received at the first position P1 and power of wireless locating signal received at the second position P2, so as to obtain relative position information between the first position P1 and the second position P2.

Figure 4:
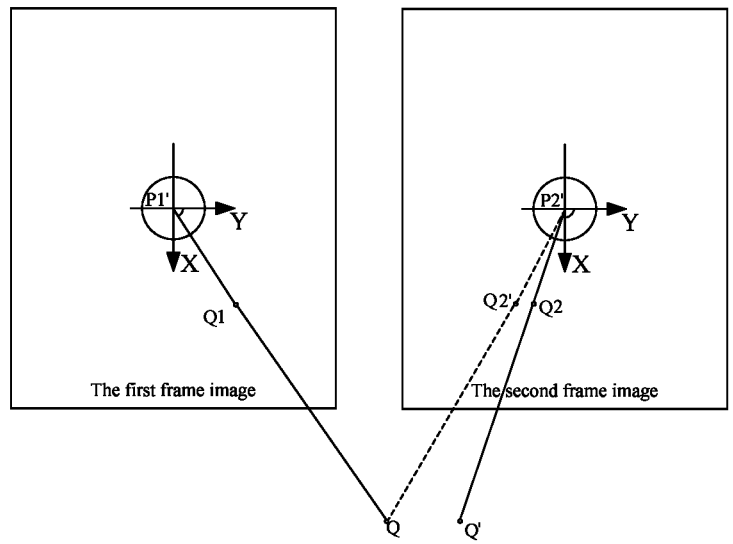
FIG. 4 shows image schematic diagrams of two images selected in another embodiment of the present application.

During the movement of a mobile robot, when there is a human body in the captured first frame image and second frame image, the movement of the human body has an attribute of indefinite change. Please refer to FIG. 4 which shows image schematic diagrams of two images selected in another embodiment of the present application. In the present embodiment, the principal optic axis of the visual sensing device is set to be vertical to a moving plane, then a plane in which a two-dimensional image captured by the visual sensing device is located is in parallel with the moving plane of the mobile robot. In this manner, the position of an entity object in the image captured by the visual sensing device can be used to indicate a position at which the entity object is projected onto the moving plane of the mobile robot, and an angle of the position of the entity object in the image relative to a travelling direction of the mobile robot is used to indicate an angle of the position at which the entity object is projected onto the moving plane of the mobile robot relative to the travelling direction of the mobile robot. Two images selected in FIG. 4 are the first frame image and the second frame image respectively, the corresponding position at which the mobile robot acquires the first frame image is the first position P1', and the corresponding position at which the mobile robot acquires the second frame image is the second position P2'. In the present embodiment, when the mobile robot moves from the first position P1' to the second position P2', the mobile robot only changes in distance but not in pose, and relative position information of the mobile robot at the first position P1' and the second position P2' can be acquired only by measuring relative displacement between the first position P1' and the second position P2'. The two images have an image overlapping region, and there is a human body Q as shown in FIG. 4 in an overlapped field of view of the visual sensing device. In the embodiment, the human body moves as a whole, that is, a position of the human body is changed, and during the mobile robot moves from the first position to the second position, the human body Q moves as a whole and turns to a human body Q' at a new position, and a position of the human body Q in the second frame image is changed indefinitely relative to a position of the human body Q in the first frame image, that is, the position change amplitude of the human body Q in the two images has no correlation with movement information of the mobile robot in the first position P1' and the second position P2', the position change of the human body Q in the two images cannot be obtained based on the movement information of the mobile robot at the first position P1' and the second position P2', and in the present embodiment, the movement information can be for example a movement distance when the mobile robot moves from the first position P1' to the second position P2'. In the present embodiment, the mobile robot includes a position measurement device, and the movement information of the mobile robot can be acquired by the position measurement device of the mobile robot. For another example, the position measurement device can measure a moving speed of the mobile robot, and calculates a relative displacement from the first position to the second position based on the moving speed and moving time. In some other embodiments, the position measurement device can be a GPS system or a device which can perform location process through measuring wireless signals, and relative position information between the first position P1' and the second position P2' can be obtained base on the GPS system or localization information of the device which can perform location process through measuring wireless signals in the first position and the second position. As shown in FIG. 4, a position of the human body Q in the first frame image is a human body projection Q1, a position of the human body Q' in the second frame image is a human body projection Q2, and when the human body Q is a static target, the position of the human body in the second frame image should be a human body projection Q2', that is, the human body projection Q2' is an image projection position after the human body projection Q1 is subjected to a definite change when the mobile robot moves from the first position P1' to the second position P2', while in the present embodiment, the position change of the human body Q in the two images cannot be obtained based on the movement information of the mobile robot at the first position P1' and the second position P2', and the human body Q has an attribute of indefinite change during the movement of the mobile robot.

In some embodiments, the processing device can determine the human body which moves relative to the static target and obtaining movement information of the human body based on a comparison result between at least two images; wherein the human body is a target having an attribute of indefinite change in the first frame image and the second frame image, and the human body should be in the overlapped field of view of the visual sensing device, that is, the position of the human body in an image should be in the image overlapping region of the first frame image and the second frame image, and the movement of the human body relative to the static target in the image overlapping region between the first frame image and the second frame image can be a whole body movement or partial body movement.

In some embodiments, the processing device can perform an image compensation on the at least two images based on movement information of the movement device for the duration of the at least two images being captured; in some embodiments, during the mobile robot moves from the first position to the second position, the movement information is generated due to the movement of the mobile robot, herein, the movement information contains relative displacement and relative pose change of the mobile robot which moves from the first position to the second position. The movement information can be measured by the position measurement device, and according to a proportional relationship between unit length and actual length in an image captured by the visual sensing device, a definite relative displacement of the position of projected image for the static target in the image overlapping region of the second frame image and the first frame image can be obtained, and relative pose change of the mobile robot can be obtained according to a pose detection device of the mobile robot, therefore, the image compensation can be performed on the first frame image or the second frame image according to movement information. For example, the image compensation can be performed on the first frame image according to the movement information or the image compensation can be performed on the second frame image according to the movement information.

The processing device can also perform a subtraction processing on the at least two images which are subjected to image compensation so as to form a difference image, that is, the compensated second frame image and the original first frame image are subjected to subtraction processing to form a difference image, or the compensated first frame image and the original second frame image are subjected to subtraction processing to form a difference image. When there is not a human body which moves relative to a static target in an image overlapping region of the first frame image and the second frame image, the subtraction result of images which are subjected to image compensation is zero, and the difference image regarding the image overlapping regions of the first frame image and the second frame image should not contain any feature, that is, the image overlapping region of the compensated second frame image and the image overlapping region of the original first frame image are the same, or the image overlapping region of the compensated first frame image and the image overlapping region of the original second frame image are the same. When there is a human body which moves as a whole or moves partially relative to a static target in an image overlapping region of the first frame image and the second frame image, the subtraction result of images which are subjected to image compensation is not zero, and the difference image regarding the image overlapping regions of the first frame image and the second frame image contains discriminative features, that is, the image overlapping region of the compensated second frame image and the image overlapping region of the original first frame image are not the same, so the image overlapping region of the original first frame image and the image overlapping region of the compensated second frame image can not coincide, or the image overlapping region of the compensated first frame image and the image overlapping region of the original second frame image are not the same, so the image overlapping region of the compensated first frame image and the image overlapping region of the original second frame image can not coincide. If there is discriminative feature in the difference image regarding image overlapping regions of two compensated images, or the image overlapping regions of two compensated images cannot be completely coincided with each other, and the discriminative feature is corresponding to a preset human feature, it is determined that there is a human body, which may lead to misdetermination. For example, there is a puppet in a human form which can be lighted in the first frame image and the second frame image, when the mobile robot is at the first position, there is the puppet which is turned off in the overlapped field of view, and when the mobile robot is at the second position and the puppet in the overlapped field of view is turned on, according to the above step, there is a discriminative feature in the image overlapping regions of the captured first frame image and the second frame image, and the difference result regarding image overlapping regions after the images being compensated cannot be zero, that is, the image overlapping regions after the images being compensated cannot be completely coincided, therefore, if a human body is determined only through the above manner, the puppet will be misdetermined to be the human body. Therefore, in a case that the difference image is not zero, when, based on the difference image, determining that the discriminative feature indicates there is a first moving track during the visual sensing device captures the first frame image and the second frame image, it is determined that there is a human body. That is, there is a human body corresponding to the first moving track in the overlapped field of view. The first moving track can be generated by whole body movement of the human body or partial body movement of the human body.

The movement of the human body is generally a continuous movement. In order to improve the accuracy and effectiveness of the system, it is necessary to track the human body to confirm that the human body is a human body having an attribute of indefinite change.

The processing device can obtain a moving track of a human body through tracking the human body; if the moving track of the human body is continuous, the human body is determined to be a human body having an attribute of indefinite change. In some embodiments, in multiple-frame images captured by the visual sensing device, a third frame image which is captured when the mobile robot moves to the third position is captured continuously. The first frame image, the second frame image and the third frame image are images captured in sequence, and the second frame image and the third frame image have an image overlapping region. In view of this, a comparison detection is performed on the second frame image and the third frame image so as to determine that there is discriminative feature in the second frame image and the third frame image, and if the discriminative feature is the same or similar to the discriminative feature obtained by the comparison between the first frame image and the second frame image, and the discriminative feature corresponds to the feature information of the preset human body, a second moving track of the human body during the visual sensing device captures the second frame image and the third frame image can be obtained based on the difference image. When the first moving track and the second moving track are continuous, the human body is determined to be an effective human body. In order to ensure the accuracy of the identification of the human body, more frame images can be acquired in sequence by the visual sensing device in a relatively continuous time, and the current acquired image and the adjacent image can be compared so as to obtain more moving tracks of the human body, therefore, whether the human body is a human body with a continuous moving track can be determined, such that the accuracy of the identification of the human body can be improved.

In some other embodiments, the human body can be tracked according to image features of the human body. Wherein the image feature includes preset graphic feature corresponding to the human body, or image feature obtained through performing an image processing algorithm on the human body. Wherein the image processing algorithm includes but is not limited to at least one of the following: grayscale processing, sharpening processing, contour extraction, corner extraction, line extraction, and image processing algorithms obtained through machine learning. Image processing algorithms obtained through machine learning include but are not limited to: neural network algorithm and clustering algorithm. In multiple-frame images captured by the visual sensing device, a third frame image which is captured when the mobile robot moves to the third position is captured continuously. The first frame image, the second frame image and the third frame image are images captured in sequence, and the second frame image and the third frame image have an image overlapping region. A human body is searched in the third frame image according to image features of the human body, if there is a static target within an overlapping field of view during the visual sensing device captures the second frame image and the third frame image, and according to relative position information of the mobile robot in the second position and the third position, and a position change (whole body movement or partial body movement) of the human body with respect to the identical static target in the second frame image and the third frame image, a second moving track of the human body during the sensing device captures the second frame image and the third frame image can be obtained. When the first moving track and the second moving track are continuous, the human body is determined to be an effective human body. In order to ensure the accuracy of the identification of the human body, more frame images can be acquired, and the current acquired image and the adjacent image are obtained through tracking the human body according to image features of the human body so as to obtain more moving tracks of the human body, therefore, whether the human body is an effective human body can be determined, such that the accuracy of the identification of the human body can be improved.

In some embodiments, the processing device further detects the human body according to a matching operation on the corresponding feature information in the at least two images. The feature information includes at least one of the following: feature point, feature line, feature color, and so on.

The processing device extracts each feature point in the at least two images respectively, and matches each feature point extracted from the at least two images with a reference three-dimensional coordinate system; wherein the reference three-dimensional coordinate system is formed through performing three-dimensional modeling on a mobile space, and the reference three-dimensional coordinate system is marked with coordinate of each feature point on the all static targets in the mobile space. The feature point on the static target for example includes corner point, end point or inflection point etc., corresponding to the static target. In some embodiments, a set of feature points for a static target can form an external contour of the static target, that is, a static target can be identified through a set of feature points. An image identification can be performed on all the static targets in a mobile space in which a mobile robot moves in advance according to identification conditions, so as to obtain feature points related to each static target respectively, and coordinate of each feature point can be marked on the reference three-dimensional coordinate system. Coordinates of feature points of each static target can be manually uploaded according to a certain format, and the coordinates can be marked on the reference three-dimensional coordinate system.

The processing device matches preset feature information of the human body with a feature point set, wherein, the feature point set is composed of feature points in the at least two images that are not matched on the reference three-dimensional coordinate system, when matched, and the feature point set has an overall moving behavior or a partial moving behavior with respect to the static target during the visual sensing device captures the first frame image and the second frame image, so that a first moving track of the feature points set is formed, the feature points set can be determined as a human body.

It should be noted that, the above examples of identifying a human body are not mutually exclusive, and according to requirements of actual algorithm design and calculation optimization, solutions which combine the above examples or which makes an improvement on the basis of each above example shall all be deemed as specific examples under the technical idea of the present application.

In step S3, a pose instruction provided by the human body can be determined based on a detection of at least one image from the visual sensing device upon determining that there is a human body in the spatial range.

In some embodiments, by means of image position region of the human body in a corresponding image identified in the above step S2, when a pose instruction is detected, an approximate position region of a corresponding human body in the image can be determined in the at least one image acquired subsequently based on the image position region and movement information of the mobile robot, and a pose instruction can be detected based on the determined approximate position region. Wherein, according to movement information of the mobile robot, can be performed on the at least one image acquired subsequently from an image position region corresponding to a human body obtained in step S2 pixel movement, and the approximate position region can be obtained after performing operation such as expanding, shrinking or adding an offset on the image position region which is subjected to pixel movement.

In still some other embodiments, in order to improve accuracy for identifying a pose instruction, step S3 includes step S31 and step S32.

In step S31, at least one image within a detection time is acquired. For example, the visual sensing device can be an image acquisition device. The image acquisition device can capture videos. Video is constituted by image frames, the image acquisition device can capture multiple-frame images at different time in a preset time interval. In multiple-frame images, with the detection time as a period, at least one image is acquired within each detection time. The detection time can be a time length or the interval number of frames.

For another example, the mobile robot is in communication with an intelligent terminal, and the intelligent terminal can modify the time interval and/or the detection time through a specific APP (applications). For example, after the APP is opened, a modification interface of the detection time is displayed on a touch screen of the intelligent terminal, and the detection time can be modified through a touch operation on the modification interface; or the detection time can be modified through sending a detection time modification instruction directly to the mobile robot. The detection time modification instruction can be for example a voice containing modification instruction, the voice can be for example "the detection time is modified to be two seconds".

For another example, the voice can be "the interval number of frame of the detection time can be modified to be five".

In step S32, the processing device detects the at least one image to determine the pose instruction provided by the human body. In some embodiments, step S32 further includes: detecting at least one image which is acquired in a time sequence to determine an candidate pose instruction provided by the human body, and repeating the above detecting step to obtain multiple candidate pose instructions corresponding to each execution, and determining the pose instruction provided by the human body based on the obtained multiple candidate pose instructions. For example, in one embodiment, the processing device acquires 10 images in a time sequence, and detects the 10 images respectively to acquire and determine candidate pose instructions of a human body in each image. Wherein, all the candidate pose instructions in the 10 images are pose instructions indicating "stopping operation", the instruction provided by the human body is determined to be a instruction indicating "stopping operation" based on multiple same candidate pose instructions. In some other embodiments, the processing device acquires 10 images in a time sequence, and detects the 10 images respectively to acquire and determine candidate pose instructions of a human body in each image. Wherein candidate pose instructions in the front five images are pose instructions indicating "stopping operation", and candidate pose instructions in the rear five images are pose instructions indicating "moving closer to the human body (or moving approaching)", it can be seen that candidate pose instructions captured in the 10 images are not consistent, in view of this, pose instruction provided by the human body is an invalid instruction, and can be ignored directly. Pose instruction provided by a human body can be determined through identified results of multiple images which are acquired in sequence, accuracy of instruction judgment by a mobile robot can be improved, and mis-operation of users can be prevented.

In some other embodiments, machine learning can be used to detect at least one image from the visual sensing device, so as to determine the pose instruction provided by a human body, wherein step S3 further includes a step of determining the pose instruction provided by the human body by detecting the at least one image through using a second algorithm which is set based on machine learning.

In some embodiments, the second algorithm can be an algorithm containing a second neural network structure. In some embodiments, the second neural network model can be a convolutional neural network. The network structure includes an input layer, at least one hidden layer and at least one output layer. Wherein the input layer is configured to receive captured images or preprocessed images; the hidden layer includes a convolutional layer and an activation function layer, and the hidden layer even can include at least one of a normalization layer, a pooling layer and a fusion layer. The output layer is configured to output images marked with object type labels. The connection mode is determined according to a connection relationship of each layer in a neural network structure, for example, a connection relationship between a front layer and a rear layer set based on data transmission, a connection relationship with data of the front layer set based on size of a convolution kernel in each hidden layer, and a full connection, and so on. In some embodiments, the second algorithm can be trained in advance according to sample pose instructions. The sample pose instructions can include multiple poses of a human body and executive instruction corresponding to each pose of a human body. For example, when the pose of a human body is two hands crossed over his/her chest, an executive instruction corresponding to the pose of the human body indicates that the mobile robot could stop operation; when the pose of a human body is that palm is open and the center of the palm faces the human body, an executive instruction corresponding to the pose of the human body indicates that the mobile robot could move closer to the user; and when the pose of a human body is that hand is in a first clenching state, an executive instruction corresponding to the pose of the human body indicates that the mobile robot could move far away from the user. The pose of a human body and corresponding executive instruction can also have other combination forms and manifestation forms, and can also be automatically set or modified according to users in actual applications, and are not limited to what is exampled above. When the second algorithm is trained according to the sample pose instructions, a certain proportion of sample pose instructions can be taken as a training set, while other sample pose instructions can be taken as a test set. For example, 80% sample pose instructions are taken as a training set, and 20% sample pose instructions are taken as a test set.

According to the trained results, the pose instruction provided by a human body can be determined through performing the second algorithm on one image from the visual sensing device. Or multiple images which are acquired in a time sequence are identified through the second algorithm, and a pose instruction corresponding to each image can be acquired. When pose instructions corresponding to the multiple images are the same, the pose instructions are valid instructions, and the mobile robot can be controlled to perform corresponding operations according to the valid pose instructions. However, when pose instructions corresponding to multiple images are different, pose instructions currently provided by the human body are invalid instructions, and the pose instructions are ignored directly.

In some other embodiments, multiple images which are acquired in a time sequence can be combined into one image, and the combined image is input into the second algorithm for pose identification. Wherein, for example, pixel values of each pixel point in acquired multiple images are summed and averaged, so as to form a combined image corresponding to an average value of each pixel point, and the combined image is input to the second algorithm for pose identification. For example, N images are acquired, and pixels of N images are subjected to averaging processing according to a two-dimensional coordinate system, for example, the position coordinates corresponding to a pixel point in N images are respectively $(X_1, Y_1)$, $(X_2, Y_2)$, $(X_3, Y_3)$, ... $(X_N, Y_N)$, then the coordinates corresponding to the pixel point in the combined image are $((X_1+X_2+X_3+X_N)/N, (Y_1+Y_2+Y_3+Y_N)/N)$. Moreover, coordinates of other pixel points in the combined image can be acquired through this method, and the combined image can be acquired. It should be noted that, the above averaging processing can also be replaced by normalization processing, and will not be described in detail herein.

In some embodiments, the second neural network model (or second neural network structure) can be updated according to the currently updated sample pose instructions. Wherein due to the heavy computational efforts in training and updating the second neural network model, the requirement of hardware in device which carries and executes the algorithm is high. In some embodiments, the training and updating for the second neural network model can be performed on a cloud server, so as to reduce operating pressure of the local mobile robot, lower requirements of hardware in the mobile robot, and improve executive efficiency of the mobile robot. Further, a strong processing function of the cloud server can be utilized sufficiently, such that the above method can be performed more rapidly and accurately.

In step S4: the mobile robot can be controlled to perform a corresponding operation based on the pose instruction.

Herein, the corresponding operation performed by the processing device can be only related to the pose instruction identified by the mobile robot, or can be related to the pose instruction identified by the mobile robot and the state of the mobile robot when the mobile robot identifies the pose instruction.

Figure 5:
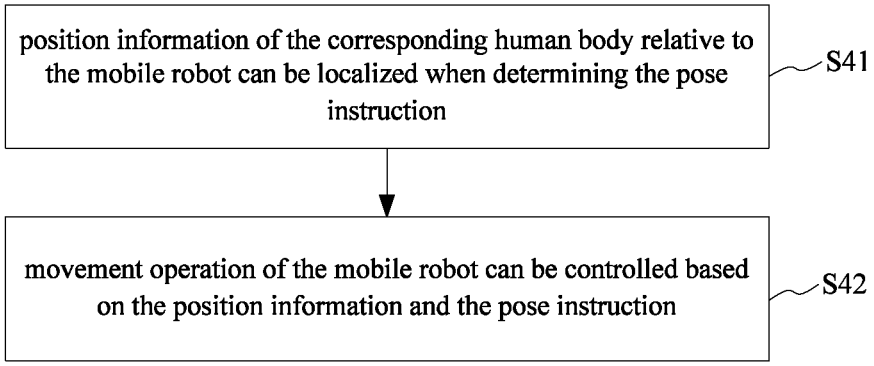
FIG. 5 shows a flow diagram of controlling a mobile robot to perform a corresponding operation based on a pose instruction in one embodiment of the present application.

Please refer to FIG. 5 which shows a flow diagram of controlling a mobile robot to perform a corresponding operation based on a pose instruction in one embodiment of the present application. Wherein step S4 further includes step S41 and step S42.

In step S41, position information of the corresponding human body relative to the mobile robot can be localized when determining the pose instruction.

Herein, when the determined pose instruction contains a movement instruction which is used for controlling the movement of the mobile robot, especially if the contained movement instruction is a movement instruction which is used for controlling the mobile robot to move relative to a human body, position information of the human body relative to the mobile robot can be localized. For example, if the pose instruction indicates that the mobile robot moves closer to the human body, the position information of the human body relative to the mobile robot is localized, and a navigation route closer to the human body is determined to be performed. For another example, if the pose instruction indicates that the mobile robot moves far away from the human body, the position information of the human body relative to the mobile robot is localized, and a navigation route far away from the human body is determined to be performed.

Wherein the manner of localizing the position information includes but is not limited to: 1) a corresponding relationship between an image coordinate system and a physical space coordinate system is constructed in advance, acquire a position of a matching feature in an image frame at the current time and a position of the matching feature in an image frame at a previous time and to determine a location of the robot according to the corresponding relationship and the positions, wherein, the location of the robot includes a position and a pose of the robot. Herein, the method of localizing the position information of a mobile robot relative to a human body described in the U.S. patent application Ser. No. 16/043,746 can herein incorporated by reference, and will not be described in detail herein.

2) a three-dimensional measuring device which is assembled on the mobile robot is used to measure position information of a human body relative to the mobile robot. For example, position information of a human body relative to the mobile robot is measured based on multiple images which contain the same human body and acquired by multiple visual sensing devices of the mobile robot.

3) the mobile robot is assembled with an image acquisition device and a movement sensing device, wherein, an optic axis of the image acquisition device is vertical to a plane over which the mobile robot moves. The image acquisition device is a visual sensing device, and the movement sensing device is configured to measure displacement and pose of the mobile robot during movement. The image acquisition device is used to capture a first frame image and a second frame image respectively when a mobile robot moves to a first position and a second position at which a human body can be captured, and the movement sensing device is used to acquire position information of the first position and position information of the second position, wherein the position information includes displacement between the first position and the second position, angle information of the mobile robot at the first position and angle information of the mobile robot at the second position, and so on; and position information of the human body relative to the mobile robot can be determined based on angle information of the human body identified from the first frame image relative to the mobile robot at the first position, and angle information of the human body identified from the second frame image relative to the mobile robot at the second frame image, the first position and the second position of the robot.

In step S42, movement operation of the mobile robot can be controlled based on the position information and the pose instruction. In some applications, the processing device plans a navigation route of the mobile robot based on the position information and the pose instruction; and controls the movement operation of the mobile robot according to the planned navigation route.

With the pose of a human body which is correspond to a pose instruction indicating closer to the human being palm of a user is open and the center of the palm faces the human body as an example, and according to the position information and the pose instruction indicating closer to the human, after the pose instruction is identified, the processing device plans a first navigation route, and controls the mobile robot to move towards a direction close to the human body based on the first navigation route. With the pose of a human body which is correspond to a pose instruction indicating keeping far away from the human being hand of a user is in a first clenching state as an example, and according to the position information and the pose instruction indicating keeping far away from the human, after the pose instruction is identified, the processing device plans a second navigation route, and controls the mobile robot to move towards a direction far away from the human body based on the second navigation route.

Correspondingly, the step of planning a navigation route of the mobile robot based on the position information and the pose instruction comprises: planning a navigation route of the mobile robot based on the position information, the pose instruction and uncleaned regions. In some embodiments, the cleaning robot can build a map by means of a VSLAM (Visual Simultaneous Localization and Mapping) technique in advance. The map can be for example a grid map, in the case of setting a mapping relationship between the size of unit grid and the unit size of a physical space, a position relationship between the cleaning robot and a static target in a spatial range in which the cleaning robot is located can be determined. Meanwhile, a cleaning robot can mark region which is cleaned or which is not cleaned by the cleaning robot in the grid map in real time according to corresponding position of the robot in the grid map.

When the identified pose instruction includes a movement instruction, the processing device can plan a navigation route according to the position information, the pose instruction and uncleaned regions in the spatial range in which the cleaning robot is located, and the navigation route can be a navigation route which covers the uncleaned regions at the extreme. For example, when the identified pose instruction is a pose instruction indicating keeping far away from the human, that is, the mobile robot is controlled to move towards a direction far away from a human body, based on this, three navigation routes can be obtained according to the pose instruction and a position information of the cleaning robot relative to a human body. In the case of the number of grids corresponding to uncleaned region covered by the three navigation routes increases in sequence, the processing device selects the third navigation route and controls the cleaning robot to move towards a direction far away from the human body based on the third navigation route.

In some embodiments, a control method of the mobile robot further includes a step of verifying a permission of the human body that provides the pose instruction, such that misoperation of users with no permission on the mobile robot can be prevented, and safety in using of the mobile robot can be ensured. Wherein, face images of users with usage permission can be pre-recorded and can be determined to be face image of a user with usage permission; or a statistics can be performed on the identified image features of face images of users during a movement of the mobile robot, and image features of face images of users that exceeds a preset proportion threshold can be determined to be face image of a user with usage permission.

In some examples, when the mobile robot determines that there is a human body in the spatial range taken by the visual sensing device, that is, facial identification is performed on the human body according to face images recorded in advance, so as to judge whether the current human body is the human body with an operating permission on the mobile robot. When the current body does not have an operating permission on the mobile robot, the currently identified human body is ignored, and the pose which is provided by the current human body is not identified. When the current human body has an operating permission on the mobile robot, step S3 and step S4 are performed, and a pose instruction provided by the human body is identified, and the mobile robot is controlled to perform a corresponding operation according to identified pose instruction. Wherein in step S3, the manner of identifying a pose instruction includes: based on identified position region of the human body with a permission in the image, the pose instruction is identified in the at least one image which is acquired subsequently. For example, according to moving direction and moving displacement of a mobile robot, a corresponding position region in the at least one image acquired subsequently which is correspond to the position region of a human body with a permission in one image is estimated, and in the estimated position region, the pose instruction is identified, so identification efficiency can be improved. For another example, an image tracking technique can be used to estimate corresponding position region of a human body with a permission in the at least one image acquired subsequently, and the pose instruction can be identified in the estimated position region.

When multiple human bodies with a permission are identified, the mobile robot can select and track any human body with a permission, and can perform a corresponding operation base on the pose instruction provided by a corresponding human body through performing steps S3 and S4.

In some examples, the mobile robot selects one of the human bodies with a permission based on a proportion of position region occupied by the identified human bodies with a permission in the image, and performs steps S3 and S4 so as to perform a corresponding operation base on the pose instruction provided by corresponding human body. For example, when the mobile robot identifies three human bodies with a permission, the mobile robot determines, in the image in which the three human bodies are identified, respective pixel proportion of image region of each of three human bodies in the image, and selects a human body with the largest pixel proportion as a provider of the pose instruction, and further identifies the pose instruction through estimating position region of the corresponding human body in subsequent images, and performs a corresponding operation based on the identified pose instruction.

In some other examples, the mobile robot selects and tracks a pose instruction provided by one of the human bodies with a permission based on a distance between the mobile robot and each human body with a permission, wherein, the distance can be obtained through measurement. For example, the mobile robot selects a pose instruction provided by a human body with a permission which is closest to the mobile robot and responses to this pose instruction. Wherein the manner of measuring a distance between the mobile robot and each human body with a permission include but is not limited to: determining a distance between the mobile robot and each human body with a permission by using any of the above manners for localizing the position information. For example, the mobile robot verifies each human body with a permission through identifying face in the image, and measures position information of each human body with a permission relative to the mobile robot in combination with a three-dimensional measuring device of the mobile robot, selects a human body with a permission which is closest to the mobile robot according to obtained relative position information, and identifies a pose instruction provided by the above human body.

In an interaction process between any of the above mobile robots and a user, in order to determine a pose instruction provided by a user timely, the method further includes a step of showing user that the pose instruction is responsed. Wherein the pose instruction include but is not limited to pose instructions mentioned in any of the above examples. The manner of showing user that the pose instruction is responsed can include any of the following: showing user that the pose instruction is responsed through controlling device such as sound or light which is arranged on a mobile robot; showing user that the pose instruction is responsed through using multimedia devices which are in communication with the mobile robot; and showing user that the pose instruction is responsed through controlling the mobile device of the mobile robot to perform preset response action.

For example, when or before the mobile robot performs a corresponding operation based on a pose instruction, it can be shown that the pose instruction is responsed to user through adjusting brightness or color of LED light arranged on a surface of the mobile robot. For another example, in a case of the mobile robot is in communication with an intelligent terminal in advance, when or before the mobile robot performs a corresponding operation based on a pose instruction, it can be shown that the pose instruction is responsed to user through instructing a microphone or an oscillator of the intelligent terminal to perform corresponding operation. For still another example, when or before the mobile robot perform a corresponding operation based on a pose instruction, it can be shown that the pose instruction is responsed to user through preset response actions, wherein response actions for example include: turning around, moving back and forth repeatedly, or swinging from side to side.

With regard to a cleaning robot, in addition to responding to the pose instruction or a permission verification provided by any of the above examples, the cleaning robot can further perform a step of outputting a control instruction corresponding to the pose instruction to the executive device based on the pose instruction, and adjusting the current state of the cleaning device in the mobole robot based on the control instruction. Wherein in some operating scenarios of the cleaning robot, during the cleaning robot performs cleaning operations according to a preset navigation route, noises generated by a motor in the cleaning device will influence users, therefore, when a pose instruction provided by a user indicates that controlling the cleaning robot to lower noises, the mobile robot, based on the pose instruction, outputs a control instruction which indicates controlling the cleaning robot to lower noises, and adjusts the current state of the cleaning device according to the control instruction. In terms of cleaning modes, the state of the cleaning device can be divided into a state of a strong absorption mode and a state of a quiet mode; and in terms of operating conditions, the state of the cleaning device can include but is not limited to an opening state, a closing state and a standby state. Wherein a low-noise state can correspond to some states such as a state of a quiet mode, a closing state and a standby state in which the noise decibel is lower than a preset decibel threshold.

Wherein the main reason for the noise of a cleaning robot being higher than a decibel threshold is the operation of a cleaning device. The cleaning device at least includes a sweeping component and a dust collection component. The sweeping component can include cleaning side brushes arranged at the bottom of a housing of the cleaning robot and a side brush motor configured to control the cleaning side brushes, wherein the number of the cleaning side brushes is two, and the two cleaning side brushes are respectively arranged symmetrically at two opposite sides at the rear end of the housing, and the cleaning side brushes can be rotary cleaning side brushes, and can rotate under the control of the side brush motor. The dust collection component can include a dust chamber and a dust collector, wherein the dust chamber is internally arranged in the housing, the dust collector includes a vacuum pump, an air outlet of the dust collector is connected with the dust chamber, and an air inlet of the dust collector is arranged at the bottom of the housing.

In some embodiments, in order to facilitate interaction with a cleaning robot, the cleaning robot further includes a voice processing device which is configured to identify voice instructions. Wherein the voice processing device can include a voice input unit and an identification unit. The voice input unit can be for example a microphone. The identification unit can be for example a processor which is connected with the microphone, and the processor can be shared with a processor of a processing device in the cleaning robot or can be configured independent of the processor. In some examples, the identification unit acquires voice information provided by the voice input unit, converts the voice information to text information, and extracts voice instructions therein. In some other examples, the identification unit transmits the acquired voice information to a neural network which is configured to identify voice instructions, thereby corresponding voice instructions can be obtained.

During an operating of a cleaning device (for example, a vacuum pump), the decibel of noise generated by the cleaning robot is higher than the decibel threshold, such that the voice processing device is set to be in a high-noise environment, and during this period, it is difficult for the voice processing device in identifying voice instructions from the collected voice signals. For example, during the cleaning robot performs cleaning operations, since decibel of a noise of a cleaning device is higher than the decibel threshold, if a control solution of a cleaning robot mentioned in a patent document with a publication number of KR1020150014237A is used, the accuracy rate of identifying voice instructions which are acquired by using a directional voice input unit is extremely low, thereby the technical solution in KR1020150014237A cannot be used to interact with a cleaning robot directly.

In view of this, in some embodiments, the pose instruction further include a pose instruction indicating noise reduction, and for example, a pose of human body corresponding to the pose instruction indicating noise reduction can be two hands of a user crossed in front of his/her chest. According to the pose instruction indicating noise reduction, the processing device controls the cleaning device of the cleaning robot to turn to a low-noise state. For example, according to the pose instruction indicating noise reduction, the processing device controls the vacuum pump to stop operating. Or the vacuum pump operates at multiple gears, the processing device can control an operating gear of the vacuum pump to be lowered to a preset low-noise gear according to the pose instruction indicating noise reduction.

When the cleaning device in the mobile robot is adjusted to be at a low-noise state based on the pose instruction, the method further includes a step of acquiring voice instructions and controlling the mobile robot to perform corresponding operations based on the acquired voice instructions. For example, the voice instruction contains entity object information corresponding to entity object in a spatial range in which the cleaning robot is located, and the entity object information can also be premarked in a map in which the cleaning robot is located according to image identification and localization methods. The voice instruction can be for example "go to a table to clean", the cleaning robot plans a navigation route from its current position to the table according to the entity object information, i.e., the table information, and the cleaning robot is controlled to move to the table according to the currently planned navigation route and performs cleaning operations. The voice instruction for example can also be "table", the cleaning robot plans a navigation route from its current position to the table according to the entity object information, i.e., the table information, and the cleaning robot is controlled to move to the table according to the currently planned navigation route, and performs cleaning operations after moving to the table by default. The voice instruction can be acquired when the cleaning device is at a low-noise state, so that the problems that the voice instructions cannot be acquired accurately due to noises of the cleaning device generated in an operating process can be prevented.

The control method of a mobile robot of the present application have the following beneficial effects: through the technical solution that identifying images captured by a visual sensing device and when determining there is a human body in a spatial range taken by the visual sensing device, determining a pose instruction provided by the human body according to at least one image of the human body, and controlling the mobile robot to perform a corresponding operation based on the pose instruction, the pose instruction of the human can be accurately identified, and accuracy and flexibility in executing instruction by the mobile robot can be improved. Meanwhile, the mobile robot can be controlled in real time according to the pose instruction, such that interactivity between a mobile robot and a user can be improved, humanized operation of a mobile robot can be improved, and user experience can be enhanced.

Figure 6:
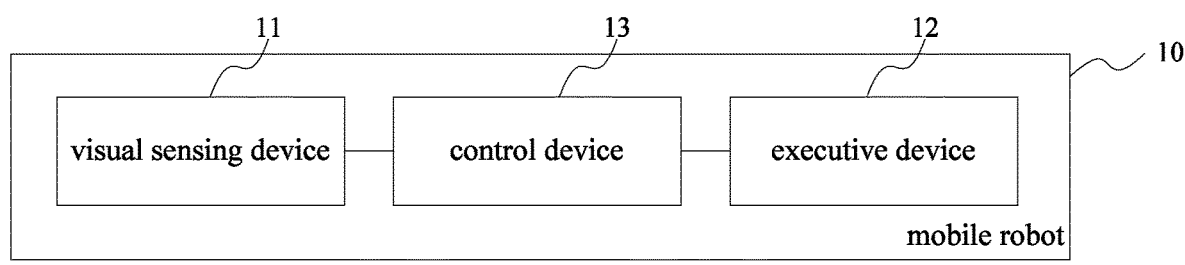
FIG. 6 shows a structural schematic diagram of a mobile robot of the present application in one embodiment.

Please refer to FIG. 6 which is a structural schematic diagram of a mobile robot of the present application in one embodiment. A mobile robot 10 includes a visual sensing device 11, an executive device 12 and a control device 13.

The visual sensing device 11 is configured to acquire images. Wherein the visual sensing device 11 can be an image acquisition device or a TOF sensor which can describe surface shape, color or structure of an object within a spatial range by using two-dimensional or three-dimensional data. The mobile robot 10 includes but is not limited to: a household robot, a cleaning robot, a patrol robot, or a windowing-cleaning robot.

Wherein, the mobile robot 10 at least includes an image acquisition device. The image acquisition device captures images within a field of view of the image acquisition device at a position in which a mobile robot is located. In some embodiments, the image acquisition device is arranged on the top, shoulder or back of the mobile robot, and a principal optic axis thereof is vertical to a plane over which the mobile moves (hereinafter, moving plane) of the mobile robot, or the principal optic axis thereof is consistent with an travelling direction of the mobile robot. In some other embodiments, the principal optic axis can also be set to form an included angle (for example, an angle between 0° and 90°) with the moving plane of the mobile robot, so as to obtain more features. In other embodiments, the principal optic axis of the image acquisition device can also be set in many other ways, for example, the image acquisition device can rotate according to a certain rule or randomly, at this time, the angle between the optic axis of the image acquisition device and a travelling direction of the mobile robot is changed, therefore, assemble manners of the image acquisition device and states of the principal optic axis of the image acquisition device are not limited to the present embodiments. Herein, the mobile robot includes at least one image acquisition device, the image acquisition device can be assembled on the mobile robot by any manners mentioned above and can acquire images which are used for performing the control method. The image acquisition device includes but is not limited to: camera, video camera, camera modules integrated with an optical system or CCD chips, and camera modules integrated with an optical system and CMOS chips. Or, the image acquisition device includes but is not limited to: fisheye camera modules, wide angle (or non-wide angle) camera modules.

The TOF sensor is based on the TOF technology. The TOF technology is one of optical non-contact three-dimensional depth measurement sensing methods, and has multiple illumination units which constitutes area arrays, and each illumination unit is used to detect depth data of a corresponding measurement point. Wherein, for example, a single illumination unit can obtain distance from a target through continuously transmitting a light pulse to the target, receiving light returned from the object, and detecting the flight (round trip) time of the emission of light pulse and reception of light pulse. Each illumination unit of the TOF emits light after being high-frequency modulation. In general, high-performance pulsed light can be emit by LED or laser (including laser diode and VCSEL (Vertical Cavity Surface Emitting Laser)). In an embodiment of the present application, laser is used to emit high performance pulsed light. The pulse can reach about 100 MHz, in view of this, infrared light is mainly used. The principles of TOF sensor application are: 1) optical shutter-based method; this method can be implemented through the following steps: emitting a pulsed light wave, and obtaining the time difference t of the light wave reflected back after being irradiated to the three-dimensional object quickly by the optical shutter, due to the speed of light c is known, as long as the time difference between the emission of light and the reception of light is known, the distance of roundtrip can be obtained by $d = t/2 \cdot c$. 2) continuous wave intensity modulation-based method; this method can be implemented through the following steps: emitting a beam of illumination light, and performing distance measurement by using a phase change of the emitted light wave signal and the reflected light wave signal. The wavelength of the illumination module in the illumination unit is generally in the infrared band, and high frequency modulation is required. The photosensitive module in the illumination unit is similar to the ordinary mobile phone camera module, and comprises a chip, a lens, a circuit board and the like. Each pixel of the TOF sensor chip records the phase of the emitted light wave between the camera and the object respectively, the data processing unit extracts the phase difference, and the depth information is calculated by the formula. The TOF sensor has a small volume and can directly output the depth data of the detected object, and the depth calculation result of the TOF sensor is not affected by the gray level and characteristics of the object surface, so the TOF sensors can perform the three-dimensional detection very accurately, and images used for monitoring can be obtained based on the depth data and the corresponding measurement lattice position, or after the depth data of each measurement lattice position is smoothed. The TOF sensor can be mounted on the body side of the mobile robot.

The executive device 12 is configured to perform a corresponding operation based on received control instruction.

The control device 13 is connected with the visual sensing device 11, and the control device 13 is an electronic device which is capable of performing numeric calculation, logical calculation or data analysis, and the processing device includes but is not limited to: CPU, GPU or FPGA, and volatile memory configured to temporarily store intermediate data generated during calculation. The control device 13 is configured to perform the control method and output a control instruction corresponding a pose instruction to the executive device 12. Wherein for the control method, please refer to FIG. 1 and related description of FIG. 1, and it will not be described in detail herein.

In some embodiments, the executive device 12 can include a movement device. The movement device can include a travelling mechanism and a travelling drive mechanism. The travelling mechanism can be arranged at a bottom of the robot, and the travelling drive mechanism is internally arranged inside the robot. The travelling mechanism can for example include a combination of two straight-going walking wheels and at least one auxiliary steering wheel, wherein the two straight-going walking wheels are respectively arranged at two opposite sides at a bottom of a robot, and the two straight-going walking wheels can be independently driven by two corresponding travelling drive mechanisms respectively, that is, a left straight-going walking wheel is driven by a left travelling drive mechanism, while a right straight-going walking wheel is driven by a right travelling drive mechanism. The universal walking wheel or the straight-going walking wheel can be provided with a biased drop suspension system which is fixed in a movable manner, for example, the biased drop suspension system can be installed on a robot in a rotatable manner and receives spring bias which is downwards or offset away from the robot. The spring bias allows the universal walking wheel or the straight-going walking wheel to maintain contact and traction with the ground at a certain landing force. In practical applications, in a case that at least one auxiliary steering wheel does not participate in travelling, the two straight-going walking wheels are mainly used for going forward and backward, while in a case that the at least one auxiliary steering wheel participates and matches with the two straight-going walking wheels in travelling, movements such as steering and rotating can be realized. The travelling drive mechanism can include a drive motor and a control circuit configured to control the drive motor, and the drive motor can be used to drive the walking wheels in the travelling mechanism to move. In specific implementations, the drive motor can be for example a reversible drive motor, and a gear shift mechanism can be arranged between the drive motor and the axle of a walking wheel. The travelling drive mechanism can be installed on the robot in a detachable manner, thereby facilitating disassembly and maintenance.

The step that the control device 13 controls the mobile robot 10 to perform a corresponding operation based on the pose instruction includes: localizing a position information of a corresponding human body relative to the mobile robot 10 when determining the pose instruction, and outputting a control instruction containing a corresponding movement operation to the executive device 12 based on the position information and the pose instruction.

Wherein, in the step of localizing a position information of the human body relative to the mobile robot 10 when determining the pose instruction, when the determined pose instruction contains a movement instruction which is used for controlling the movement of the mobile robot, especially if the contained movement instruction is a movement instruction which is used for controlling the mobile robot to move relative to a human body, position information of the human body relative to the mobile robot can be localized. For example, if the pose instruction indicates that the mobile robot moves closer to the human body, the position information of the human body relative to the mobile robot is localized, and a navigation route closer to the human body is determined to be performed. For another example, if the pose instruction indicates that the mobile robot moves far away from the human body, the position information of the human body relative to the mobile robot is localized, and a navigation route far away from the human body is determined to be performed.

Wherein the manner of localizing the position information includes but is not limited to: 1) a corresponding relationship between an image coordinate system and a physical space coordinate system is constructed in advance, acquire a position of a matching feature in an image frame at the current time and a position of the matching feature in an image frame at a previous time and to determine a location of the robot according to the corresponding relationship and the positions, wherein, the location of the robot includes a position and a pose of the robot. Herein, the method of localizing the position information of a mobile robot relative to a human body described in the U.S. patent application Ser. No. 16/043,746 can herein incorporated by reference, and will not be described in detail herein.

2) a three-dimensional measuring device which is assembled on the mobile robot is used to measure position information of a human body relative to the mobile robot. For example, position information of a human body relative to the mobile robot is measured based on multiple images which contain the same human body and acquired by multiple visual sensing devices of the mobile robot.

3) the mobile robot is assembled with an image acquisition device and a movement sensing device, wherein, an optic axis of the image acquisition device is vertical to a plane over which the mobile robot moves. The image acquisition device is a visual sensing device, and the movement sensing device is configured to measure displacement and pose of the mobile robot during movement. The image acquisition device is used to capture a first frame image and a second frame image respectively when a mobile robot moves to a first position and a second position at which a human body can be captured, and the movement sensing device is used to acquire position information of the first position and position information of the second position, wherein the position information includes displacement between the first position and the second position, angle information of the mobile robot at the first position and angle information of the mobile robot at the second position, and so on; and position information of the human body relative to the mobile robot can be determined based on angle information of the human body identified from the first frame image relative to the mobile robot at the first position, and angle information of the human body identified from the second frame image relative to the mobile robot at the second frame image, the first position and the second position of the robot.

In some embodiments, the control device 13 outputs a control instruction containing a corresponding movement operation to the executive device 12 based on the position information and the pose instruction comprises: the control device 13 plans a navigation route of the mobile robot 10 based on the position information and the pose instruction, and outputs a control instruction containing the navigation route to the executive device 12, such that the executive device 12 can perform a movement operation based on the navigation route.

With the pose of a human body which is correspond to a pose instruction indicating closer to the human being palm of a user is open and the center of the palm faces the human body as an example, and according to the position information and the pose instruction indicating closer to the human, after the pose instruction is identified, the control device 13 plans a first navigation route, and controls the movement device of the mobile robot 10 to move towards a direction close to the human body based on the first navigation route. With the pose of a human body which is correspond to a pose instruction indicating keeping far away from the human being hand of a user is in a first clenching state as an example, and according to the position information and the pose instruction indicating keeping far away from the human, after the pose instruction is identified, the control device 13 plans a second navigation route, and controls the movement device of the mobile robot 10 to move towards a direction far away from the human body based on the second navigation route.

Correspondingly, the step of planning a navigation route of the mobile robot based on the position information and the pose instruction comprises: planning a navigation route of the mobile robot based on the position information, the pose instruction and uncleaned regions. In some embodiments, the cleaning robot can build a map by means of a VSLAM (Visual Simultaneous Localization and Mapping) technique in advance. The map can be for example a grid map, in the case of setting a mapping relationship between the size of unit grid and the unit size of a physical space, a position relationship between the cleaning robot and a static target in a spatial range in which the cleaning robot is located can be determined. Meanwhile, a cleaning robot can mark region which is cleaned or which is not cleaned by the cleaning robot in the grid map in real time according to corresponding position of the robot in the grid map.

When the identified pose instruction includes a movement instruction, the processing device can plan a navigation route according to the position information, the pose instruction and uncleaned regions in the spatial range in which the cleaning robot is located, and the navigation route can be a navigation route which covers the uncleaned regions at the extreme. For example, when the identified pose instruction is a pose instruction indicating keeping far away from the human, that is, the mobile robot is controlled to move towards a direction far away from a human body, based on this, three navigation routes can be obtained according to the pose instruction and a position information of the cleaning robot relative to a human body. In the case of the number of grids corresponding to uncleaned region covered by the three navigation routes increases in sequence, the processing device selects the third navigation route and controls the cleaning robot to move towards a direction far away from the human body based on the third navigation route.

In some embodiments, the control device of the mobile robot verifies a permission of the human body that provides the pose instruction, such that misoperation of users with no permission on the mobile robot can be prevented, and safety in using of the mobile robot can be ensured. Wherein, face images of users with usage permission can be pre-recorded and can be determined to be face image of a user with usage permission; or a statistics can be performed on the identified image features of face images of users during a movement of the mobile robot, and image features of face images of users that exceeds a preset proportion threshold can be determined to be face image of a user with usage permission.

In some examples, when the control device determines that there is a human body in the spatial range taken by the visual sensing device, that is, facial identification is performed on the human body according to face images recorded in advance, so as to judge whether the current human body is the human body with an operating permission on the mobile robot. When the current body does not have an operating permission on the mobile robot, the currently identified human body is ignored, and the pose which is provided by the current human body is not identified. When the current human body has an operating permission on the mobile robot, step S3 and step S4 are performed, and a pose instruction provided by the human body is identified, and the mobile robot is controlled to perform a corresponding operation according to identified pose instruction. Wherein in step S3, the control device identifies a pose instruction includes: based on identified position region of the human body with a permission in the image, the pose instruction is identified in the at least one image which is acquired subsequently. For example, according to moving direction and moving displacement of a mobile robot, a corresponding position region in the at least one image acquired subsequently which is correspond to the position region of a human body with a permission in one image is estimated by the control device, and in the estimated position region, the pose instruction is identified, so identification efficiency can be improved. For another example, an image tracking technique can be used by the control device to estimate corresponding position region of a human body with a permission in the at least one image acquired subsequently, and the pose instruction can be identified in the estimated position region.

When multiple human bodies with a permission are identified, the control device can select and track any human body with a permission, and can perform a corresponding operation base on the pose instruction provided by a corresponding human body through performing steps S3 and S4.

In some examples, the control device selects one of the human bodies with a permission based on a proportion of position region occupied by the identified human bodies with a permission in the image, and performs steps S3 and S4 so as to perform a corresponding operation base on the pose instruction provided by corresponding human body. For example, when the control device t identifies three human bodies with a permission, the mobile robot determines, in the image in which the three human bodies are identified, respective pixel proportion of image region of each of three human bodies in the image, and selects a human body with the largest pixel proportion as a provider of the pose instruction, and further identifies the pose instruction through estimating position region of the corresponding human body in subsequent images, and performs a corresponding operation based on the identified pose instruction.

In some other examples, the control device selects and tracks a pose instruction provided by one of the human bodies with a permission based on a distance between the mobile robot and each human body with a permission, wherein, the distance can be obtained through measurement. For example, the control device selects a pose instruction provided by a human body with a permission which is closest to the mobile robot and responses to this pose instruction. Wherein the manner of measuring a distance between the mobile robot and each human body with a permission include but is not limited to: determining a distance between the mobile robot and each human body with a permission by using any of the above manners for localizing the position information. For example, the control device verifies each human body with a permission through identifying face in the image, and measures position information of each human body with a permission relative to the mobile robot in combination with a three-dimensional measuring device of the mobile robot, selects a human body with a permission which is closest to the mobile robot according to obtained relative position information, and identifies a pose instruction provided by the above human body.

In an interaction process between any of the above mobile robots and a user, in order to determine a pose instruction provided by a user timely, the control device further performs a step of showing user that the pose instruction is responsed. Wherein the pose instruction include but is not limited to pose instructions mentioned in any of the above examples.

Herein, based on the data connection relationship between the control device and the interactive device provided in the mobile robot, the control device shows user that the pose instruction is responsed can include any of the following: showing user that the pose instruction is responsed through controlling device such as sound or light which is arranged on a mobile robot; showing user that the pose instruction is responsed through using multimedia devices which are in communication with the mobile robot; and showing user that the pose instruction is responsed through controlling the mobile device of the mobile robot to perform preset response action.

For example, when or before the control device performs a corresponding operation based on a pose instruction, it can be shown that the pose instruction is responsed to user through adjusting brightness or color of LED light arranged on a surface of the mobile robot. For another example, in a case of the control device is in communication with an intelligent terminal in advance through a communication module in the mobile robot, when or before the control device performs a corresponding operation based on a pose instruction, it can be shown that the pose instruction is responsed to user through instructing a microphone or an oscillator of the intelligent terminal to perform corresponding operation. For still another example, when or before the control device perform a corresponding operation based on a pose instruction, the movement device can be controlled based on a preset response actions, so as to show the user that the pose instruction is responsed, wherein response actions for example include: turning around, moving back and forth repeatedly, or swinging from side to side.

When the mobile robot 10 is a cleaning robot, in addition to responding to the control instruction and a permission verification provided by any of the above examples, the control device can further perform a step of outputting a control instruction corresponding to the pose instruction to the executive device based on the pose instruction, and adjusting the current state of the cleaning device in the mobole robot based on the control instruction. Wherein, the executive device includes a cleaning device, in some operating scenarios of the cleaning robot, during the cleaning robot performs cleaning operations according to a preset navigation route, noises generated by a motor in the cleaning device will influence users, therefore, when a pose instruction provided by a user indicates that controlling the cleaning robot to lower noises, the control device 13 of the mobile robot 10, based on the pose instruction, outputs a control instruction which indicates controlling the cleaning robot to lower noises, and adjusts the current state of the cleaning device according to the control instruction. In terms of cleaning modes, the state of the cleaning device can be divided into a state of a strong absorption mode and a state of a quiet mode; and in terms of operating conditions, the state of the cleaning device can include but is not limited to an opening state, a closing state and a standby state. Wherein a low-noise state can correspond to some states such as a state of a quiet mode, a closing state and a standby state in which the noise decibel is lower than a preset decibel threshold.

Wherein the main reason for the noise of a cleaning robot being higher than a decibel threshold is the operation of a cleaning device. The cleaning device at least includes a sweeping component and a dust collection component. The sweeping component can include cleaning side brushes arranged at the bottom of a housing of the cleaning robot and a side brush motor configured to control the cleaning side brushes, wherein the number of the cleaning side brushes is two, and the two cleaning side brushes are respectively arranged symmetrically at two opposite sides at the rear end of the housing, and the cleaning side brushes can be rotary cleaning side brushes, and can rotate under the control of the side brush motor. The dust collection component can include a dust chamber and a dust collector, wherein the dust chamber is internally arranged in the housing, the dust collector includes a vacuum pump, an air outlet of the dust collector is connected with the dust chamber, and an air inlet of the dust collector is arranged at the bottom of the housing.

In some embodiments, in order to facilitate interaction with a cleaning robot, the cleaning robot further includes a voice processing device which is configured to identify voice instructions. Wherein the voice processing device can include a voice input unit and an identification unit. The voice input unit can be for example a microphone. The identification unit can be for example a processor which is connected with the microphone, and the processor can be shared with a processor of a processing device in the cleaning robot or can be configured independent of the processor. In some examples, the identification unit acquires voice information provided by the voice input unit, converts the voice information to text information, and extracts voice instructions therein. In some other examples, the identification unit transmits the acquired voice information to a neural network which is configured to identify voice instructions, thereby corresponding voice instructions can be obtained.

During an operating of a cleaning device (for example, a vacuum pump), the decibel of noise generated by the cleaning robot is higher than the decibel threshold, such that the voice processing device is set to be in a high-noise environment, and during this period, it is difficult for the voice processing device in identifying voice instructions from the collected voice signals. For example, during the cleaning robot performs cleaning operations, since decibel of a noise of a cleaning device is higher than the decibel threshold, if a control solution of a cleaning robot mentioned in a patent document with a publication number of KR1020150014237A is used, the accuracy rate of identifying voice instructions which are acquired by using a directional voice input unit is extremely low, thereby the technical solution in KR1020150014237A cannot be used to interact with a cleaning robot directly.

When the control device 13 in the mobile robot is adjusted to be at a low-noise state based on the pose instruction, the control device controls the executive device 12 to perform corresponding operations based on the acquired voice instructions. For example, the voice instruction contains entity object information corresponding to entity object in a spatial range in which the cleaning robot is located, and the entity object information can also be premarked in a map in which the cleaning robot is located according to image identification and localization methods. The voice instruction can be for example "go to a table to clean", the cleaning robot plans a navigation route from its current position to the table according to the entity object information, i.e., the table information, and the cleaning robot is controlled to move to the table according to the currently planned navigation route and performs cleaning operations. The voice instruction for example can also be "table", the cleaning robot plans a navigation route from its current position to the table according to the entity object information, i.e., the table information, and the cleaning robot is controlled to move to the table according to the currently planned navigation route, and performs cleaning operations after moving to the table by default. The voice instruction can be acquired when the cleaning device is at a low-noise state, so that the problems that the voice instructions cannot be acquired accurately due to noises of the cleaning device generated in an operating process can be prevented.

Figure 7:
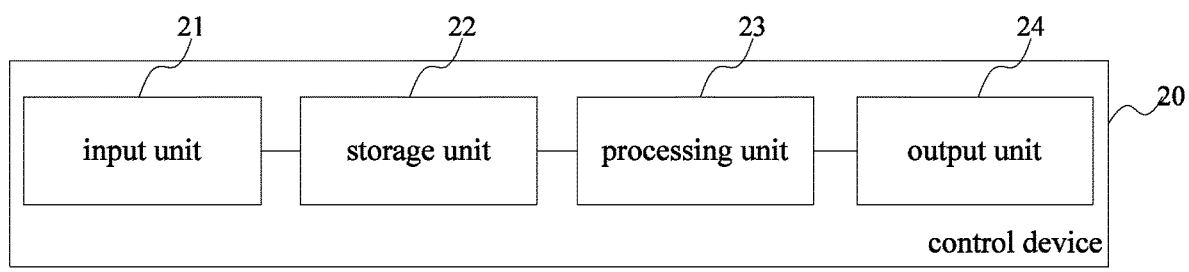
FIG. 7 shows a structural schematic diagram of a control device for a mobile robot of the present application in one embodiment.

Please refer to FIG. 7 which shows a structural schematic diagram of a control device for a mobile robot of the present application in one embodiment.

The mobile robot includes a visual sensing device and an executive device. The mobile robot includes but is not limited to: a household robot, a cleaning robot, a patrol robot, or a window-cleaning robot. The visual sensing device can be an image acquisition device or a TOF sensor which can describe surface shape, color or structure of an object within a spatial range by using two-dimensional or three-dimensional data. The executive device for example includes a movement device and a cleaning device.

Herein, the control device 20 includes an input unit 21, a storage unit 22, a processing unit 23 and an output unit 24.

The input unit 21 is configured to receive images captured by the visual sensing device, and the visual sensing device captures images within a field of view of the visual sensing device at a position in which a mobile robot is located. The input unit 21 can be an interface which is electrically connected with the visual sensing device and is configured to transmit data or instruction. The interface can be for example serial interface or parallel interface, such as USB interface, data bus interface, and so on.

The storage unit 22 is configured to store at least one program and images captured by the visual sensing device of the mobile robot; the storage unit 22 can include a high speed random access memory and a non-volatile memory, for example, one or more disk storage devices, flash memory devices or other non-volatile solid state storage devices. In some embodiments, the storage unit 22 can also include a storage unit 22 which is away from one or more processing units 23, for example, a network attached storage unit 22 accessed via an RF circuit or an external port or a communication network. Wherein, the communication network can be an Internet, one or more intranets, a local region network (LAN), a wireless local region network (WLAN), a storage region network (SAN) or combination thereof.

The processing unit 23 is configured to invoke at least one program and perform the control method. The processing unit 23 is an electronic device which is capable of performing numeric calculation, logical calculation or data analysis, and includes but is not limited to: CPU, GPU or FPGA. For the control method, please refer to FIG. 1 and related description of FIG. 1, and it will not be described in detail herein.

The output unit 24 is configured to output a control instruction which is generated when the processing unit 23 performs the control method to corresponding executive device. The output unit 24 can be an interface which is electrically connected with the executive device and is configured to transmit data or instruction. The interface can be for example serial interface or parallel interface, such as USB interface, data bus interface, and so on.

In another embodiment of the present application, a computer readable storage medium is further disclosed. The computer readable storage medium stores at least one program, and the at least one program is used for performing the control method when being invoked. Wherein for the control method, please refer to FIG. 1 and related description of FIG. 1, and it will not be described in detail herein.

In addition, it should also be noted that, through the description of the above implementations, those skilled in the art can clearly understand that part or all of the present application can be realized by means of software and in combination with necessary general-purpose hardware platforms. Based on this, the present application further provides a storage medium of an computer apparatus, the storage medium stores at least one program, and when the program are executed by processor, the navigation method described above can be performed.

Based on this understanding, the technical solutions of the present application essentially or the part contributing to the prior art can be embodied in the form of a software product, the computer software product can include one or more machine readable media which store machine executable instructions thereon, when these instructions are executed by one or more machines such as a computer, a computer network or other electronic apparatus, such one or more machines can execute operations based on the embodiments of the present application, for example, executing each step in the control method of the mobile robot, etc. The machine readable media include but are not limited to, a floppy disk, an optical disk, a CD-ROM (a compact disc-read only memory), a magnetic optical disc, an ROM (read-only memory), an RAM (random access memory), an EPROM (erasable programmable read-only memory), an EEPROM (electrically erasable programmable read-only memory), a magnetic card or optical card, a flash memory or other types of media/machine readable media which are applicable to storing machine executable instructions. Wherein the storage media can be located in the mobile robot and can also be located in a third-party server, for example, in a server providing a certain application store. Specific application stores are not limited herein, and can be a MIUI application store, a Huawei application store, and an Apple application store, etc.

The application can be used in numerous general-purpose or special-purpose calculating system environments or configurations, for example, personal computer, server computer, handheld device or portable device, tablet device, multiprocessor system, microprocessor based system, set top box, programmable consumer electronic device, network PC, small-size computer, large-scale computer, and a distributed computing environment containing any of the above system or device.

The present application can be described in the general context of the computer executable instructions executed by the computer, such as a program module. Generally, the program module includes routines, programs, objects, components, data structures and the like which execute particular tasks or realize particular abstract data types. The present application can also be practiced in the distributed computing environments. In these distributed computing environments, tasks are executed by remote processing devices which are connected via a communication network. In the distributed computing environments, the program module can be located in a local and remote computer storage medium including a storage device.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed:

1. A method for controlling a mobile robot, wherein the mobile robot comprises a visual sensing device, and the method comprises:
   monitoring images from the visual sensing device;
   identifying the images to determine whether there is an actual human body in a spatial range taken by the visual sensing device, the identifying comprising:
      determining whether there is an actual human body through screening the images based on a preset screening condition, the preset screening condition is set based on an image feature corresponding to an actual human body and/or a dummy; or
      determining whether there is an actual human body based on an attribute of indefinite change of positions of a human body in at least two of the images;
   determining a pose instruction provided by the actual human body based on a detection of at least one image from the visual sensing device upon determining that there is an actual human body in the spatial range; and
   controlling the mobile robot to perform a corresponding operation based on the pose instruction.

2. A mobile robot, comprising:
   a visual sensing device, configured to acquire images;
   an executive device, configured to perform a corresponding operation based on a received control instruction;
   a control device, connected with the visual sensing device, and configured to perform the following control method, the control method comprises the following steps:
   monitoring images from the visual sensing device;
   identifying the images to determine whether there is an actual human body in a spatial range taken by the visual sensing device, the identifying comprising:
      determining whether there is an actual human body through screening the images based on a preset screening condition, the preset screening condition is set based on an image feature corresponding to an actual human body and/or a dummy; or
      determining whether there is an actual human body based on an attribute of indefinite change of positions of a human body in at least two of the images;
   determining a pose instruction provided by the actual human body based on a detection of at least one image from the visual sensing device upon determining that there is an actual human body in the spatial range; and
   outputting a control instruction corresponding to the pose instruction to the executive device based on the pose instruction, and controlling the mobile robot to perform a corresponding operation based on the control instruction.

3. The mobile robot of claim 2, wherein the step of identifying the images to determine whether there is an actual human body in a spatial range taken by the visual sensing device comprises: identifying the images to determine whether there is an actual human body which faces towards the mobile robot in a spatial range taken by the visual sensing device.

4. The mobile robot of claim 2, wherein the step of identifying the images to determine whether there is an actual human body in a spatial range taken by the visual sensing device comprises:
   identifying the monitored images by using a first algorithm; wherein the first algorithm is obtained through performing machine learning on sample images of an actual human body images containing faces; and
   determining whether there is an actual human body which faces towards the mobile robot in the spatial range based on the identified result.

5. The mobile robot of claim 2, wherein the step of identifying the images to determine whether there is an actual human body in a spatial range taken by the visual sensing device comprises:
   during a movement of the mobile robot, determining a human body which moves relative to a static target and obtaining movement information of the human body based on a comparison result between at least two monitored images; wherein positions of the human body in the at least two images have an attribute of indefinite change.

6. The mobile robot of claim 2, wherein the step of determining a pose instruction provided by the actual human body based on a detection of at least one image from the visual sensing device comprises:
acquiring at least one image within a detection time; and
detecting the at least one image to determine the pose instruction provided by the actual human body.

7. The mobile robot of claim 6, wherein the step of detecting the at least one image to determine the pose instruction provided by the actual human body comprises:
detecting at least one image which is acquired in a time sequence to determine an candidate pose instruction provided by the actual human body, and repeating the detecting step to obtain multiple candidate pose instructions for each execution; and
determining the pose instruction provided by the actual human body based on the obtained multiple candidate pose instructions.

8. The mobile robot of claim 2, wherein the step of determining a pose instruction provided by the actual human body based on a detection of at least one image from the visual sensing device comprises:
determining the pose instruction provided by the actual human body by detecting the at least one image through using a second algorithm which is set based on machine learning.

9. The mobile robot of claim 2, wherein the pose instruction executed by the control device comprise at least one of the following pose instructions: a pose instruction indicating approaching, a pose instruction indicating keeping far away, and a pose instruction indicating noise reduction.

10. The mobile robot of claim 2, wherein the control method further comprises a step of verifying a permission of the actual human body that provides the pose instruction.

11. The mobile robot of claim 10, wherein the step of verifying a permission of the actual human body that provides the pose instruction comprises: when multiple actual human bodies are determined to have a permission after verified, selecting one of the actual human bodies which have a permission, identifying a pose instruction of the selected actual human body, and performing a corresponding operation.

12. The mobile robot of claim 2, wherein the step of outputting a control instruction corresponding to the pose instruction to the executive device based on the pose instruction comprises:
localizing a position information of the actual human body relative to the mobile robot when determining the pose instruction; and
outputting a control instruction containing a corresponding movement operation to the executive device based on the position information and the pose instruction.

13. The mobile robot of claim 12, wherein the executive device comprises a movement device; and the step of outputting a control instruction containing a corresponding movement operation to the executive device based on the position information and the pose instruction comprises:
planning a navigation route of the mobile robot based on the position information and the pose instruction; and
outputting a control instruction containing the navigation route to the executive device, such that the executive device can perform a movement operation based on the navigation route.

14. The mobile robot of claim 13, wherein the mobile robot is a cleaning robot; and the step of planning a navigation route of the mobile robot based on the position information and the pose instruction comprises: planning a navigation route of the mobile robot based on the position information, the pose instruction and uncleaned regions.

15. The mobile robot of claim 2, wherein the executive device comprises a cleaning device; and the step of outputting a control instruction corresponding to the pose instruction to the executive device based on the pose instruction, and controlling the mobile robot to perform a corresponding operation based on the control instruction comprises:
outputting a control instruction corresponding to the pose instruction to the executive device based on the pose instruction, and adjusting the current state of the cleaning device based on the control instruction.

16. The mobile robot of claim 15, further comprising: a voice processing device, configured to acquire a voice instruction;
when the cleaning device is adjusted to be in a low-noise state based on the pose instruction, the control device is further configured to control the executive device to perform a corresponding operation based on the acquired voice instruction.

17. A control device for a mobile robot, wherein the mobile robot comprises a visual sensing device and an executive device, and the control device comprises:
an input unit, configured to receive images captured by the visual sensing device;
a storage unit, configured to store at least one program and images captured by the visual sensing device of the mobile robot;
a processing unit, configured to invoke the at least one program and perform the following control method; and
an output unit, configured to output a control instruction to corresponding executive device, the control instruction is generated by the processing unit and is used for performing the control method;
wherein the control method comprises:
monitoring images from the visual sensing device;
identifying the images to determine whether there is an actual human body in a spatial range taken by the visual sensing device, the identifying comprising:
determining whether there is an actual human body through screening the images based on a preset screening condition, the preset screening condition is set based on an image feature corresponding to an actual human body and/or a dummy; or
determining whether there is an actual human body based on an attribute of indefinite change of positions of a human body in at least two of the images;
determining a pose instruction provided by the actual human body based on a detection of at least one image from the visual sensing device upon determining that there is an actual human body in the spatial range; and
outputting a control instruction corresponding to the pose instruction to the executive device based on the pose instructions, and controlling the mobile robot to perform a corresponding operation based on the control instruction.

* * * * *